(12) United States Patent
Wells et al.

(10) Patent No.: US 12,516,764 B2
(45) Date of Patent: Jan. 6, 2026

(54) POLYMER PIPE, A PIPE JOINT INSERT DEVICE, A PIPE JOINT ASSEMBLY, AND METHODS OF FORMING SAME

(71) Applicant: North American Pipe Corporation, Houston, TX (US)

(72) Inventors: Andrew Wells, Wayne, PA (US); Joshua E. Clapper, Downingtown, PA (US)

(73) Assignee: WESTLAKE PIPE & FITTINGS CORPORATION, Houston, TX (US)

( * ) Notice: Subject to any disclaimer, the term of this patent is extended or adjusted under 35 U.S.C. 154(b) by 137 days.

(21) Appl. No.: 17/148,520

(22) Filed: Jan. 13, 2021

(65) Prior Publication Data

US 2021/0215287 A1  Jul. 15, 2021

Related U.S. Application Data

(60) Provisional application No. 63/117,148, filed on Nov. 23, 2020, provisional application No. 62/960,451, filed on Jan. 13, 2020.

(51) Int. Cl.
*F16L 47/08* (2006.01)
*B29C 57/02* (2006.01)
(Continued)

(52) U.S. Cl.
CPC ............ *F16L 47/08* (2013.01); *B29C 57/025* (2013.01); *B29C 57/04* (2013.01); *F16L 21/03* (2013.01);
(Continued)

(58) Field of Classification Search
CPC . F16L 47/08; F16L 47/12; F16L 21/03; F16L 47/10; F16L 37/0845; F16L 37/148; F16L 21/02; F16J 15/02; F16J 15/10
See application file for complete search history.

(56) References Cited

U.S. PATENT DOCUMENTS 4,111,464 A * 9/1978 Asano ............... F16L 47/12
285/321
4,134,949 A  1/1979 Mcgregor
(Continued)

FOREIGN PATENT DOCUMENTS

EP  1471298 A1  10/2004

OTHER PUBLICATIONS

Ritu, "Plastic Overmolding: All you need to know", Aug. 2019, Unipipes, "https://www.unipipes.com/blog/plastic-overmolding" (Year: 2019).*

(Continued)

*Primary Examiner* — Zachary T Dragicevich
*Assistant Examiner* — Alexander T Rufrano
(74) *Attorney, Agent, or Firm* — Lempia Summerfield Katz LLC

(57) ABSTRACT

A polymer pipe has a length between a first end and a second end. The length and the first end have a first diameter and the second end is a belled end having a second diameter larger than the first diameter. An insert device is received or pre-installed within the second end and has an annular body with a seal part coupled to the annular body and a spline groove formed in the annular body and facing radially inward. Another polymer pipe is inserted in the belled end to form a pipe joint assembly and has a mating spline groove on the outer surface. The spline groove and mating spline groove axially align and receive a spline therein to axially interlock the two polymer pipes to form a pipe joint assembly.

21 Claims, 25 Drawing Sheets

(51) Int. Cl.
    *B29C 57/04*     (2006.01)
    *B29L 31/24*     (2006.01)
    *F16L 21/03*     (2006.01)
    *F16L 47/10*     (2006.01)
    *F16L 47/12*     (2006.01)

(52) U.S. Cl.
    CPC ............... *F16L 47/10* (2013.01); *F16L 47/12* (2013.01); *B29L 2031/24* (2013.01)

(56) References Cited

U.S. PATENT DOCUMENTS

| | | | | |
|---|---|---|---|---|
| 4,637,618 A * | 1/1987 | Valls | ........................ | F16L 47/10 277/944 |
| 4,693,483 A * | 9/1987 | Valls | ........................ | F16L 47/10 285/379 |
| 4,826,028 A * | 5/1989 | Vassallo | .................... | F16L 21/03 285/379 |
| 4,834,430 A | 5/1989 | Vassallo et al. | | |
| 6,277,315 B1 * | 8/2001 | Hållstedt | .................. | F16L 21/03 264/250 |
| 7,134,204 B2 * | 11/2006 | Corbett, Jr. | .............. | F16L 47/08 29/447 |
| 7,252,293 B2 * | 8/2007 | Happel | .................... | F16L 21/03 277/575 |
| 7,284,310 B2 * | 10/2007 | Jones | .................. | F16L 37/0925 29/447 |
| 7,845,686 B2 * | 12/2010 | Steinbruck | ............ | F16L 37/148 285/379 |
| 8,444,186 B2 * | 5/2013 | Jones | .................. | F16L 37/0925 285/307 |
| 9,400,071 B1 | 7/2016 | Copeland | | |
| 9,951,869 B2 * | 4/2018 | Lopez-Chaves | ....... | F16J 15/022 |
| 10,107,425 B2 * | 10/2018 | Corbett, Jr. | ............ | B29B 13/025 |
| 10,876,672 B2 * | 12/2020 | Quesada | ............... | F16J 15/0818 |
| 11,098,832 B2 * | 8/2021 | Clapper | ............... | F16L 37/0845 |
| 2001/0040376 A1 | 11/2001 | Metcalfe et al. | | |
| 2009/0152863 A1 | 6/2009 | Steinbruck | | |
| 2016/0245435 A1 | 8/2016 | Corbett, Jr. et al. | | |
| 2017/0087760 A1 | 3/2017 | Copeland | | |
| 2017/0198847 A1 * | 7/2017 | Clapper | ................ | F16L 37/148 |
| 2018/0224041 A1 * | 8/2018 | Clapper | ................ | F16J 15/064 |
| 2020/0292109 A1 | 9/2020 | Quesada | | |

OTHER PUBLICATIONS

Dictionary, "THROUGH", "https://www.dictionary.com/browse/through".*
International Search Report and Written Opinion cited in corresponding PCT app. No. PCT/US21/13326; Mar. 26, 2021; 9pp.
International Search Report and Written Opinion cited in PCT app No. PCT/US21/13328; Mar. 25, 2021; 9pp.
Office Action cited in U.S. Appl. No. 17/148,523; Feb. 24, 2023; 12 pp.
European Search Report of the European Patent Office cited in European patent application No. EP 21741821.9; Jan. 25, 2024; 14 pp.
European Search Report of the European Patent Office cited in European patent application No. EP 21741871.4; Jan. 25, 2024; 13 pp.
Office Action cited in the U.S. Appl. No. 17/148,523; Nov. 17, 2023; 11 pp.
Office Action cited in the Canadian patent application No. 3,164,722; Apr. 2, 2024; 3 pp.
Office Action cited in the Canadian patent application No. 3,164,724; Apr. 4, 2024; 3 pp.
Office Action cited in the U.S. Appl. No. 17/148,523; Mar. 26, 2024; 9 pp.
Office Action cited in the Canadian patent application No. 3,164,722; May 6, 2025; 4 pp.
Communication of the European Patent Office cited in European patent application No. EP 21741821.9; Jul. 23, 2025; 7 pp.
Communication of the European Patent Office cited in European patent application No. EP 21741871.4; Jul. 23, 2025; 6 pp.

* cited by examiner

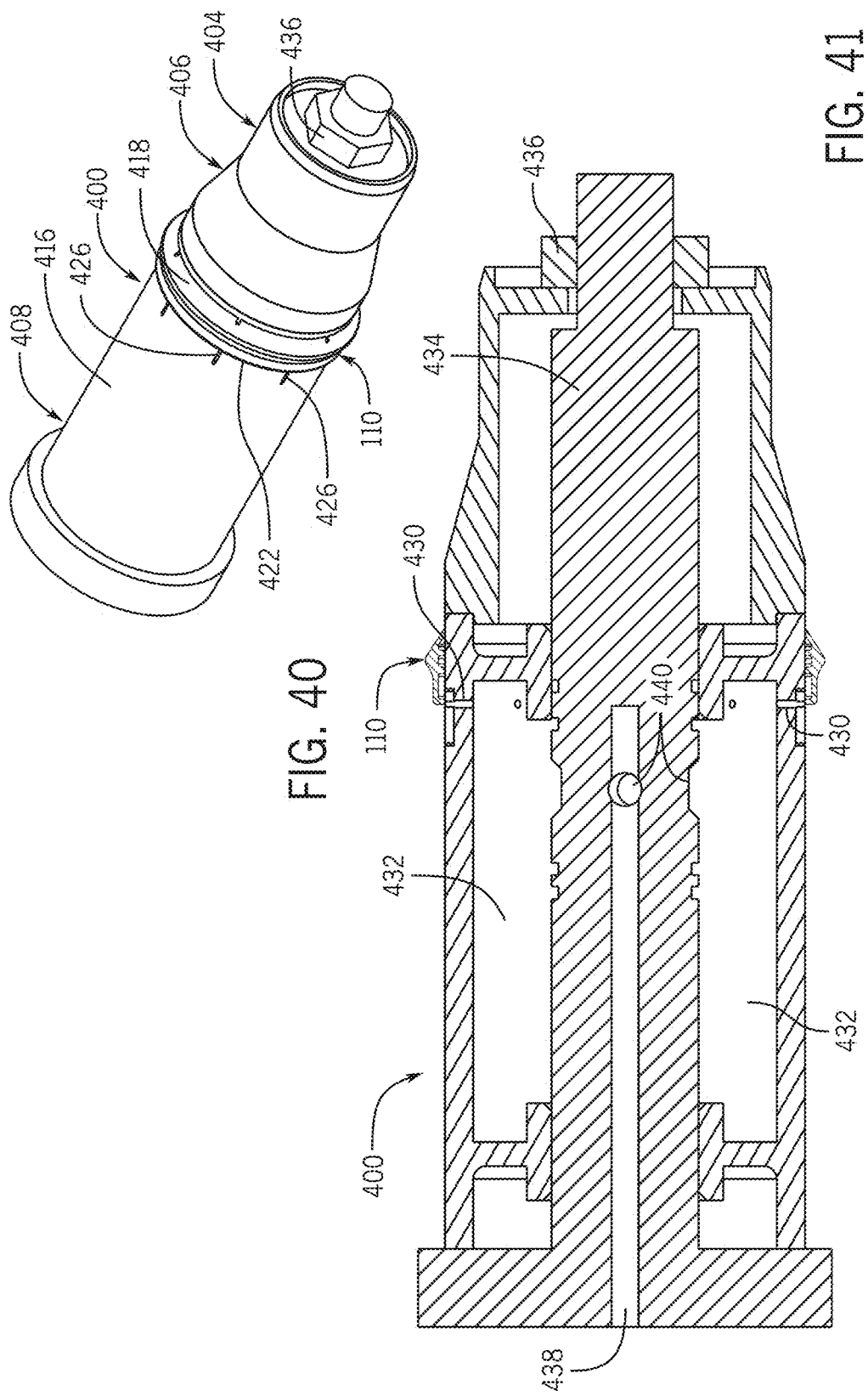

POLYMER PIPE, A PIPE JOINT INSERT DEVICE, A PIPE JOINT ASSEMBLY, AND METHODS OF FORMING SAME

RELATED APPLICATION DATA

This patent is entitled to the benefit of and claims priority to U.S. Provisional Application Ser. No. 62/960,451 filed Jan. 13, 2020 and 63/117,148 filed Nov. 23, 2020, and each entitled "Pipe Joint Insert Device, Pipe Joint Assembly, and Methods of Forming Same." The entire contents of these prior filed provisional applications are hereby incorporated herein by reference.

BACKGROUND

1. Field of the Disclosure

The present disclosure is generally directed to pipe joints, and more particularly to pipe joint insert devices and pipe joint assemblies using such insert devices, and to methods utilizing and incorporating such insert devices in pipe joints.

2. Description of Related Art

Pipe sections are joined to one another at joints to form extended lengths of pipe. Non-metallic pipe, such as polyvinyl chloride (PVC) pipe often uses mechanical locking structures, such as splines, to form the joints. Conventional spline-type, restrained pipe joint systems typically have spline grooves and separate seals that are axially spaced-apart from the splines in a pipe joint. The spline grooves and seal grooves are typically machined into the inner surface of a pipe end and the seals are typically installed separately within a pipe end as well.

Manufacturing costs are relatively high since the spline grooves and seal parts must also be separately manufactured. Additional manpower and/or time and effort are also required, both to manufacture the separate parts and to install the separate parts in a pipe joint. Examples of such designs are disclosed and described in U.S. Pat. Nos. 5,662,360, 7,284,310, and 7,537,248. Some users would benefit from improvements in restrained pipe joints, spline arrangements, pipe joint assemblies, and corresponding methods. Thus, improvements in restrained pipe joints, insert devices, and joint locking components continue to be of interest.

SUMMARY

In one example, according to the teachings of the present disclosure, a polymer pipe has a length between a first end and a second end. The length and the first end have a first diameter and the second end is a belled end having a second diameter larger than the first diameter. An insert device received within the second end and has an annular body with a seal part coupled to the annular body and a spline groove formed in the annular body and facing radially inward.

In one example, the seal part can include an inner seal facing radially inward.

In one example, the seal part can include an outer seal facing radially outward or can include both an inner seal and an outer seal.

In one example, the polymer pipe can include one or more insert recesses formed in an inside diameter (ID) surface of the second end and the annular body of the insert device can be seated in the one or more insert recesses.

In one example, the one or more insert recesses, which can be formed during a belling process at the second end of the pipe, can conform to a contour of a radially outer surface of the annular body.

In one example, the annular body can be a molded element and the seal part can be a co-molded, insert molded, or over-molded element contiguous with the annular body as a part of the insert device. A material of the annular body can be substantially rigid material and a material of the seal part can be softer or less rigid than that of the substantially rigid material of the annular body.

In one example, the polymer pipe can include a second pipe joined to the polymer pipe to form a pipe joint assembly. The second pipe can have one end installed in the second end of the polymer pipe whereby an inner seal of the seal part can contact an outside diameter (OD) surface of the second pipe.

In one example, the second pipe of the pipe joint assembly can have a mating spline groove on the OD surface that is axially aligned with the spline groove in the annular body of the insert device. A spline can be received within the spline groove and the mating spline groove to axially retain the polymer pipe and second pipe in the pipe joint assembly.

In one example, the annular body of the insert device can be formed of a polymer material and the seal part of the insert device can be formed of an elastomer material that is softer or less rigid than the polymer material.

In one example, the seal part of the insert device can have an outer seal exposed to the OD of the annular body.

In one example, an elastomer material of the seal part can be at least one of isoprene rubber (IR), styrene butadiene rubber (SBR), IR/SBR blend, nitrile, ethylene propylene diene monomer (EPDM) rubber, a synthetic rubber, and fluoropolymer elastomer.

In one example, the insert device can have an ID in a range of about 3 inches to about 48 inches and an axial length of about 0.125 inches to about 3 inches.

In one example, the annular body can include a spline portion having the spline groove, a seal portion having the seal part and axially spaced from the spline portion, and a connecting portion disposed axially between and connecting the spline portion and the seal portion.

In one example, the connecting portion can include a plurality of circumferentially spaced apart bridges or ribs and can include holes, voids, or spaces circumferentially therebetween.

In one example according to the teachings of the present disclosure, a method is provided for forming a polymer pipe having a length between a first end and a second end. The length and the first end have a first diameter and the second end is a belled end having a second diameter larger than the first diameter. The method includes forcing a mandrel into the second end, when heated, of the polymer pipe to expand the diameter to the second diameter. The method includes placing an insert device on the OD surface of the mandrel thereby forcing the mandrel and the insert device into the second end of the polymer pipe. The insert device has an annular body with a seal part coupled to the annular body and a spline groove formed in the annular body and facing radially inward. The method includes cooling the second end of the polymer pipe around the insert device thereby forming one or more insert recesses that correspond in shape to a shape of the insert device.

In one example, the method can include using a stripper plate in conjunction with the mandrel to position the insert device relative to the mandrel and the second end of the polymer pipe.

In one example, the step of cooling can be done before the mandrel is removed from the second end of the polymer pipe. A vacuum can be applied to pull or draw the second end of the polymer pipe radially toward the mandrel.

In one example, the one or more insert recesses can be formed as the pipe cools.

In one example according to the teachings of the present disclosure, an insert device is provided for a belled end of a polymer pipe. The insert device includes an annular body having a seal portion and a seal part coupled to or carried by the annular body at the seal portion and having a spline groove portion including a spline groove. The insert device is a one-piece or monolithic structure once formed.

In other examples, the insert device can include a combination of any one or more of the aspects, features, or characteristics of the insert devices as disclosed and described herein.

In one example according to the teachings of the present disclosure, a pipe joint assembly includes a polymer first pipe having a length between first and second ends, the second end being a spigot end, the length, the first end, and the spigot end having a first diameter. The pipe joint assembly includes a polymer second pipe having a length between a first end and a second end, the length and the first end having the first diameter, and the second end being a belled end having a second diameter larger than the first diameter. The pipe joint assembly includes an insert device received within the second end, the insert device having an annular body, a seal part carried by the annular body, and a spline groove formed in the annular body and facing radially inward. The spigot end of the first pipe is installed in the belled end of the second pipe. The first pipe has a mating spline groove on an OD surface that is axially aligned with the spline groove in the annular body of the insert device. The pipe joint assembly includes a spline received in the spline groove and the mating spline groove axially joining the first and second pipes.

In one example, the seal part can have an inner seal that contacts an outside diameter (OD) surface of the first pipe.

In one example, the seal part can have an outer seal that contacts an inside diameter (ID) of the second pipe or can have both an inner seal and an outer seal.

In one example, the first pipe, the second pipe, the spline, and the insert device can each be entirely non-metallic.

In one example according to the teachings of the present disclosure, a method of sealing a pipe joint includes providing a first pipe having a spigot end, providing a second pipe having a belled end, the belled end of the second pipe sized to receive therein the spigot end of the first pipe. A mating spline groove is provided on an outside diameter (OD) surface of the first pipe. The method includes installing an insert device seated in and retained within the belled end, the insert device including an annular body defining a spline groove facing radially inward and carrying a seal part. The method includes inserting the spigot end of the first pipe into the belled end of the second pipe such that the mating spline groove is axially aligned with the spline groove in the annular body. The seal part has an inner seal in contact with the OD of the first pipe at a position axially spaced from the spline groove and the mating spline groove.

In one example, the method can include inserting a spline into the spline groove and the mating spline groove to axially retain the first and second pipes joined to one another.

In one example according to the teachings of the present disclosure, a pipe system includes a polymer pipe having a length between a first end and a second end, the length and the first end having a first diameter, and the second end being a belled end having a second diameter larger than the first diameter. The pipe system includes one or more insert recesses formed in an inside diameter (ID) surface of the belled end of the polymer pipe and an insert device received within the belled end. The insert device has an annular body with an outside diameter (OD) surface seated in the one or more insert recesses and has a seal part coupled to the annular body and a spline groove formed in the annular body and facing radially inward.

In one example, the pipe system can include another polymer pipe having a spigot end installed in the belled end of the polymer pipe. The other polymer pipe can have a mating spline groove on an outside diameter (OD) surface that is axially aligned with the spline groove in the annular body of the insert device. A spline can be received in the spline groove and the mating spline groove whereby the spline axially joins the polymer pipe and the second pipe.

In one example, the seal part can have an inner seal that sealingly engages the OD surface of the other polymer pipe.

In one example, the seal part can have an outer seal that engages the ID surface of the polymer pipe or the seal part can have an inner seal and an outer seal.

BRIEF DESCRIPTION OF THE DRAWINGS

The drawings provided herewith illustrate one or more examples or embodiments of the disclosure and therefore should not be considered as limiting the scope of the disclosure. There may be other examples and embodiments that may be equally effective to achieve the objectives and that may fall within the scope of the disclosure. Objects, features, and advantages of the present invention will become apparent upon reading the following description in conjunction with the drawing figures, in which:

FIG. 40 shows a perspective view of a belling tool assembly in an assembled condition with an insert device installed thereon.

FIGS. 41 and 42 show cross-section views of a vacuum port of the belling tool assembly of FIG. 40.

The use of the same reference numbers or characters throughout the description and drawings indicates similar or identical components, aspects, and features of the disclosure.

DETAILED DESCRIPTION OF THE DISCLOSURE

The disclosure describes and shows various embodiments and examples of pipe joint insert devices, pipe joint spline grooves, pipe joint assemblies, and methods of making and assembling such insert devices, spline grooves, and assemblies. The disclosed embodiments solve or improve upon the above-mentioned and/or other problems and disadvantages with prior known pipe joint components and solutions. Objects, features, and advantages of the disclosed embodiments and examples will become apparent to those having ordinary skill in the art upon reading this disclosure.

Figure 1:
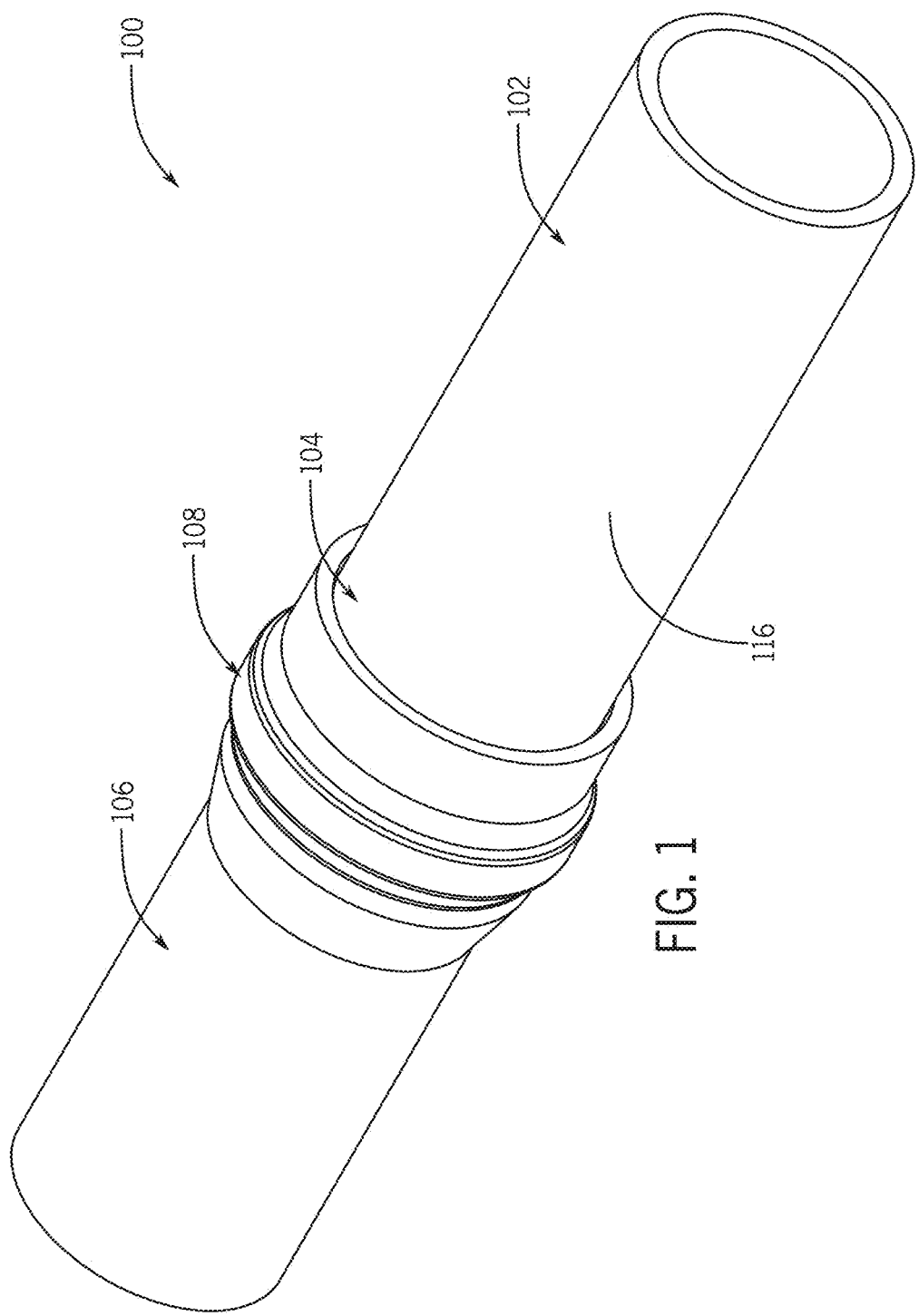
FIG. 1 shows a perspective view of one example of a pipe joint assembly constructed in accordance with the teachings of the present disclosure.
Figure 2:
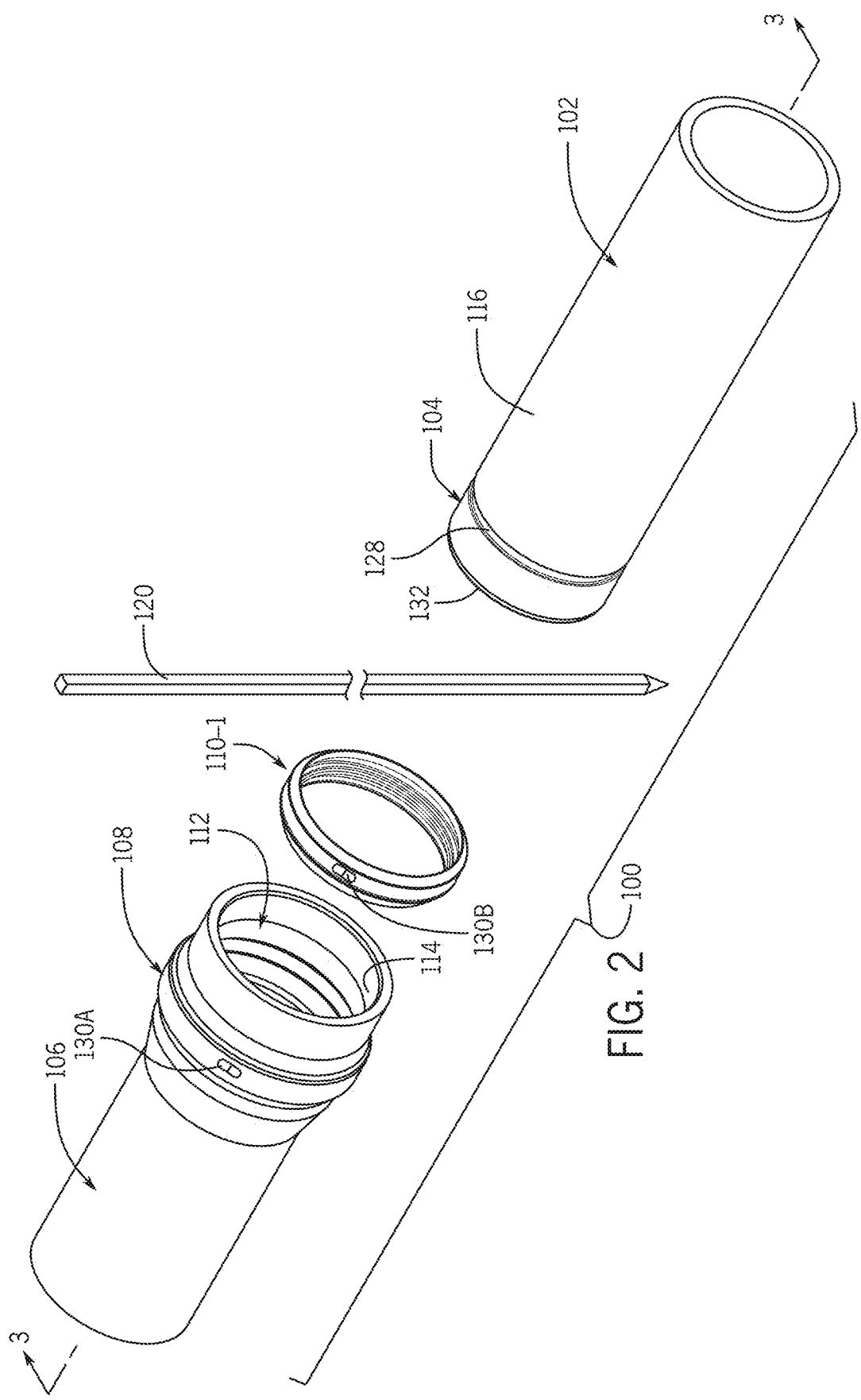
FIG. 2 shows an exploded view of the pipe joint assembly of FIG. 1 including an insert device constructed in accordance with the teachings of the present disclosure.

Turning now to the drawings, FIGS. 1 and 2 illustrate a one example of a pipe joint assembly 100 constructed in accordance with the teachings of the present disclosure. In this example, the pipe joint assembly 100 has two pipes joined to one another at the pipe joint assembly. A first pipe 102 of the two pipes has a male end or spigot 104 that may have an inside diameter (ID), a wall thickness, and an outside diameter (OD) that essentially match those of the majority of a length of the first pipe. A second pipe 106 of the two pipes has a belled end 108, i.e., a female end or socket into which the male end or spigot 104 of the first pipe 102 is received. The female end or belled end 108 of the second pipe 106 is formed, i.e., belled to have a larger ID and OD compared to those of the majority of the length of the second pipe and compared to those of the male end or spigot end 104 of the first pipe 102.

Figure 3:
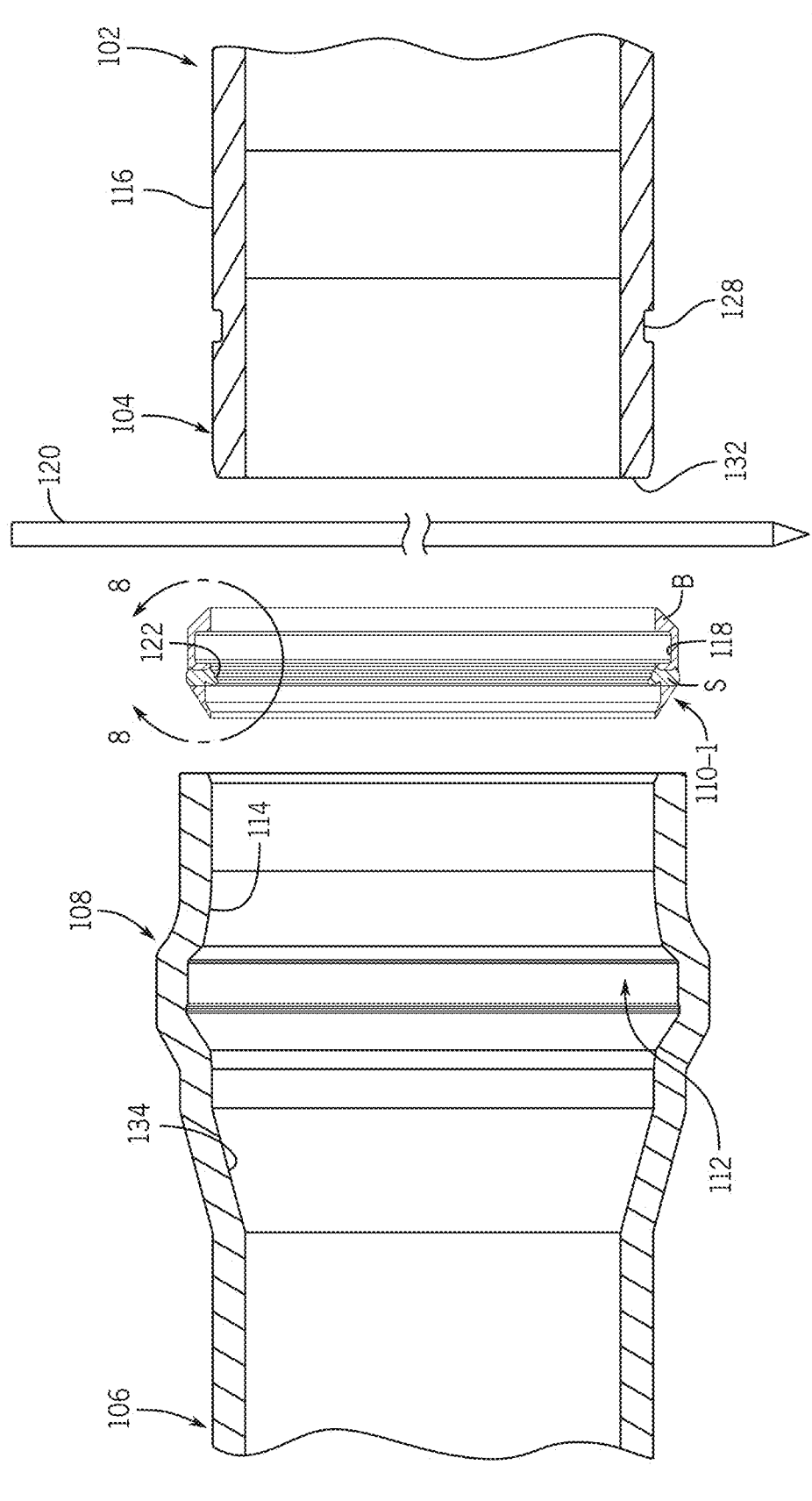
FIG. 3 shows a cross-section view taken along line 3-3 of the pipe joint assembly of FIG. 2.

As discussed further below in more detail, the female or belled end 108 of the second pipe 106 is also formed to include an insert device 110-1 installed between the first pipe 102 and second pipe in the pipe joint assembly 100. The insert device 110-1 can be called a cartridge, an insert cartridge, a groove former, a seal cartridge, a seal insert, or some other suitable term. Referring to FIG. 3, in one example, one or more grooves 112 may be formed on an inside surface 114 of the belled end 108 of the second pipe 106. The one or more grooves 112 on the pipe inside surface 114 may be formed during the belling process while forming the female or belled end 108 of the second pipe 106, as described further below. The insert device 110-1 is disposed between an outside surface 116 of the first pipe 102 and the inside surface 114 of the second pipe 106 in the pipe joint assembly 100.

In the embodiments disclosed and described herein, the insert device 110-1 creates or is implemented to create a spline groove 118 in one of the two pipes 102, 106 for receiving a spline 120, which interlocks the two pipes together at the pipe joint assembly 100. The insert device 110-1 in the embodiments disclosed and described herein is also configured to provide and create a seal 122 between the two pipes 102, 106 at the pipe joint assembly 100. The insert device 110-1 in the embodiments disclosed and described herein creates a seal between the two pipes 102, 106 and also creates the spline groove 118 in one of the two pipes. In the disclosed examples or embodiments of the pipe joint assembly 100, aspects of the insert device 110-1 can be modified and the device substituted according to alternative embodiments of the insert devices disclosed and described below.

Figure 6:
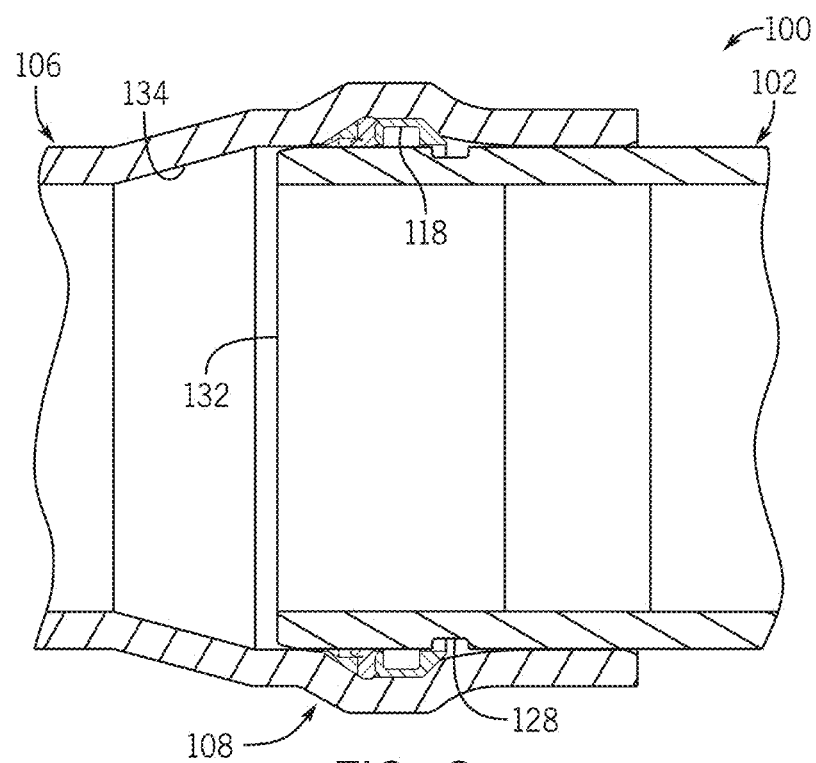
Figure 7:
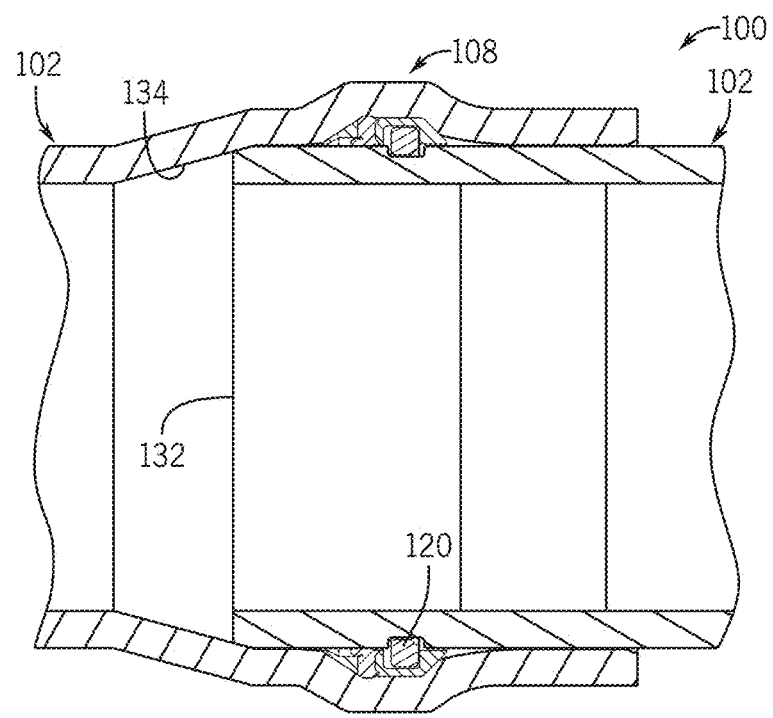
Figure 8:
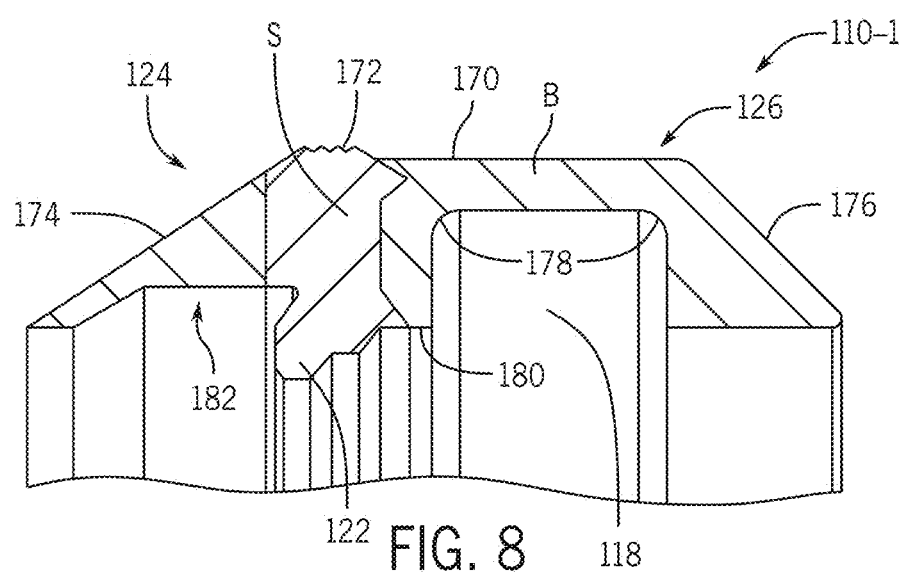
FIG. 8 shows a close up cross-section view of a portion taken from line 8-8 of the insert device of FIG. 3 depicting one example of an insert device constructed in accordance with the teachings of the present disclosure.

FIGS. 4-7 show the pipe joint assembly 100 of FIGS. 1-3 in various stages of assembly. In this example, the spline 120 of pipe joint assembly 100 is a standard extruded spline and the insert device 110-1, as depicted in FIG. 8, includes a body B with a seal portion 124 and a spline groove portion 126. In this example, the spline groove 118 is formed in the spline groove portion 126 having a single depth. The belled end 108 of the second pipe 106 is formed using the below described forming process with the insert device 110-1 pre-disposed or pre-installed within the belled end. The spigot 104 of the first pipe 102 is formed having a spline groove 128 in the OD surface 116. The insert device 110-1 and the belled end 108 of the second pipe 106 each have corresponding spline insertion holes 130a, 130b. Each insertion hole 130a, 130b is provided at a tangential angle and are aligned circumferentially or rotationally with one another and aligned axially with the spline groove 118 in the insert device 110-1.

Figure 4:
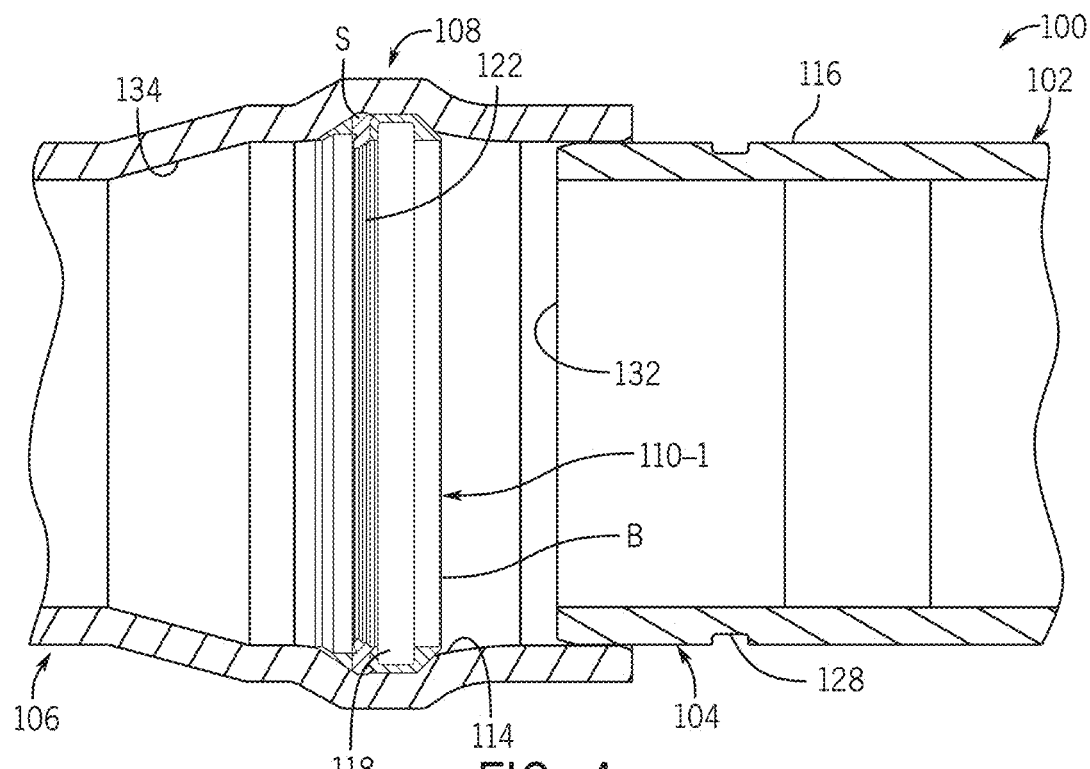
FIGS. 4-7 show views of the pipe joint assembly of FIG. 3 in progressive stages of being assembled.
Figure 5:
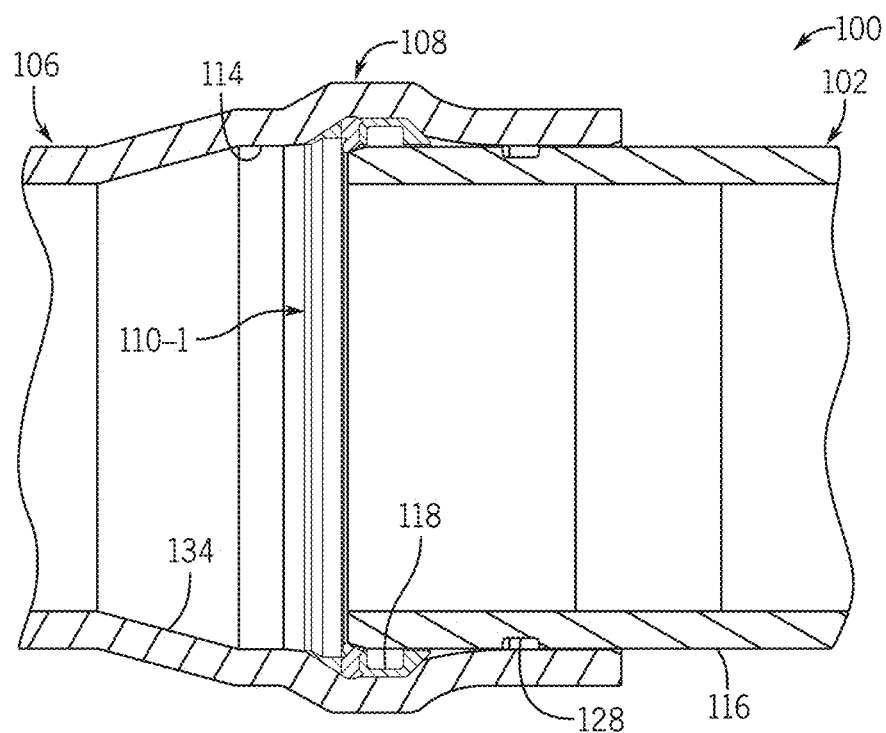

To assemble the pipe joint assembly 100, the spigot 104 of the first pipe 102 is inserted into the belled end 108 of the second pipe 106 and is pushed axially inward, as shown in FIGS. 4-6. The distal end 132 of the spigot 104 can abut an angled wall 134 or a stop in the belled end 108 of the second pipe 106. The positioning of the distal end 132, the angled wall 134, and the spline grooves 118 and 128 can be configured so that the two spline grooves automatically align with one another, as shown in FIG. 7. Alternatively, the extruded spline 120 may be used to determine, by being unblocked when pushed into the two insertion holes 130a, 130b in the insert device 110-1 and belled end 108 with the two pipes 102, 106 in the positions of FIGS. 4-6, and by being unblocked when the two spline grooves 118, 128 are aligned in the position of FIG. 7. The extruded spline 120 is then manually pushed into the aligned grooves 118, 128 via the insertion holes 130a, 130b to seat in the grooves, as depicted in FIG. 7. Once inserted, the spline 120 being captured within the two spline grooves 118, 128 and being taller in a radial direction than the depth of either groove prevents the two pipes 102, 106 from being pulled apart, as shown in FIG. 7.

FIGS. 9-13 show another example of a pipe joint assembly 140 that utilizes a radially expandable, split-ring, Certa-Lok®CLIC™ type spline 142 and an insert device 110-2.

Figure 9:
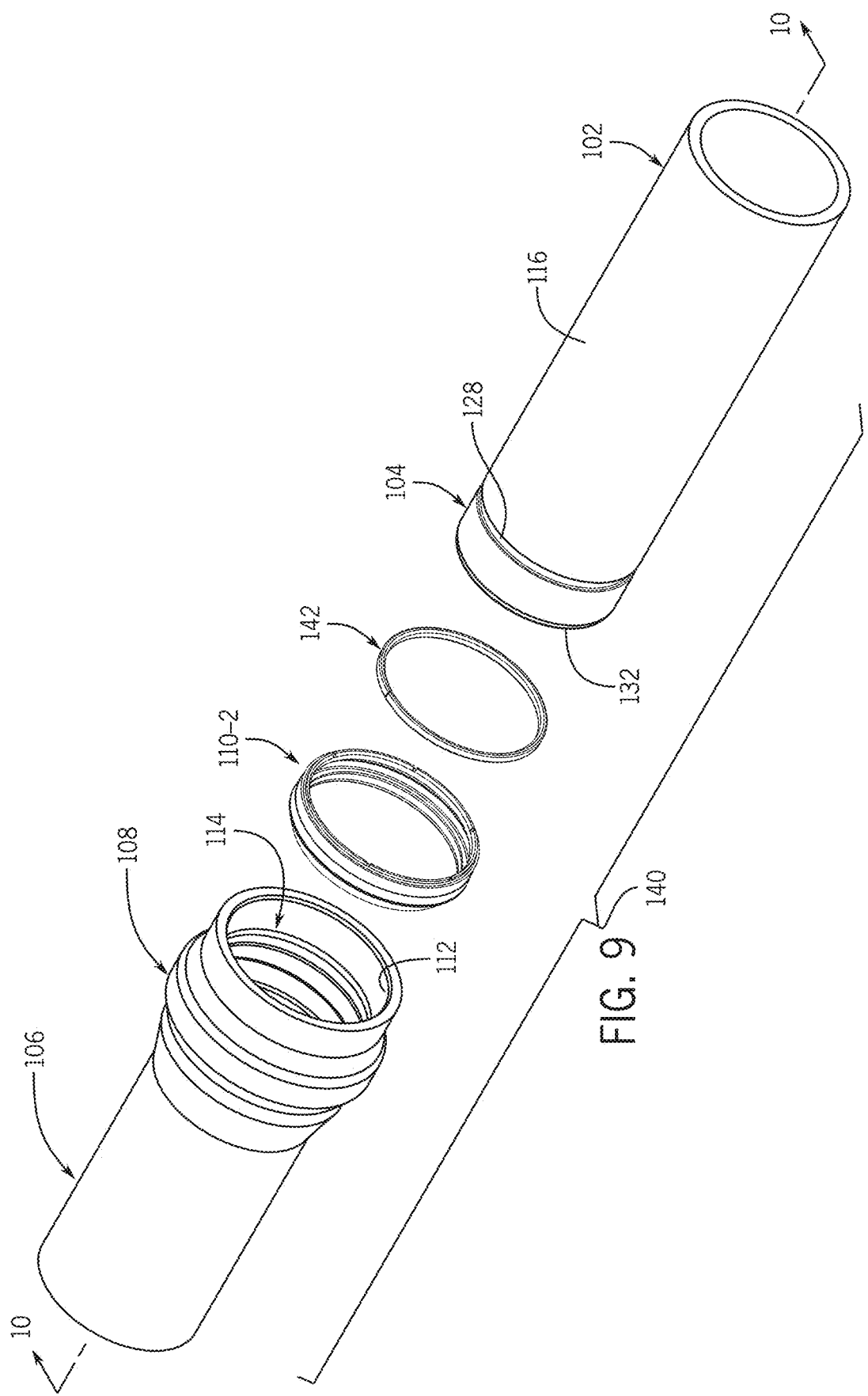
FIG. 9 shows an exploded view of another example of a pipe joint assembly including an insert device constructed in accordance with the teachings of the present disclosure.
Figure 10:
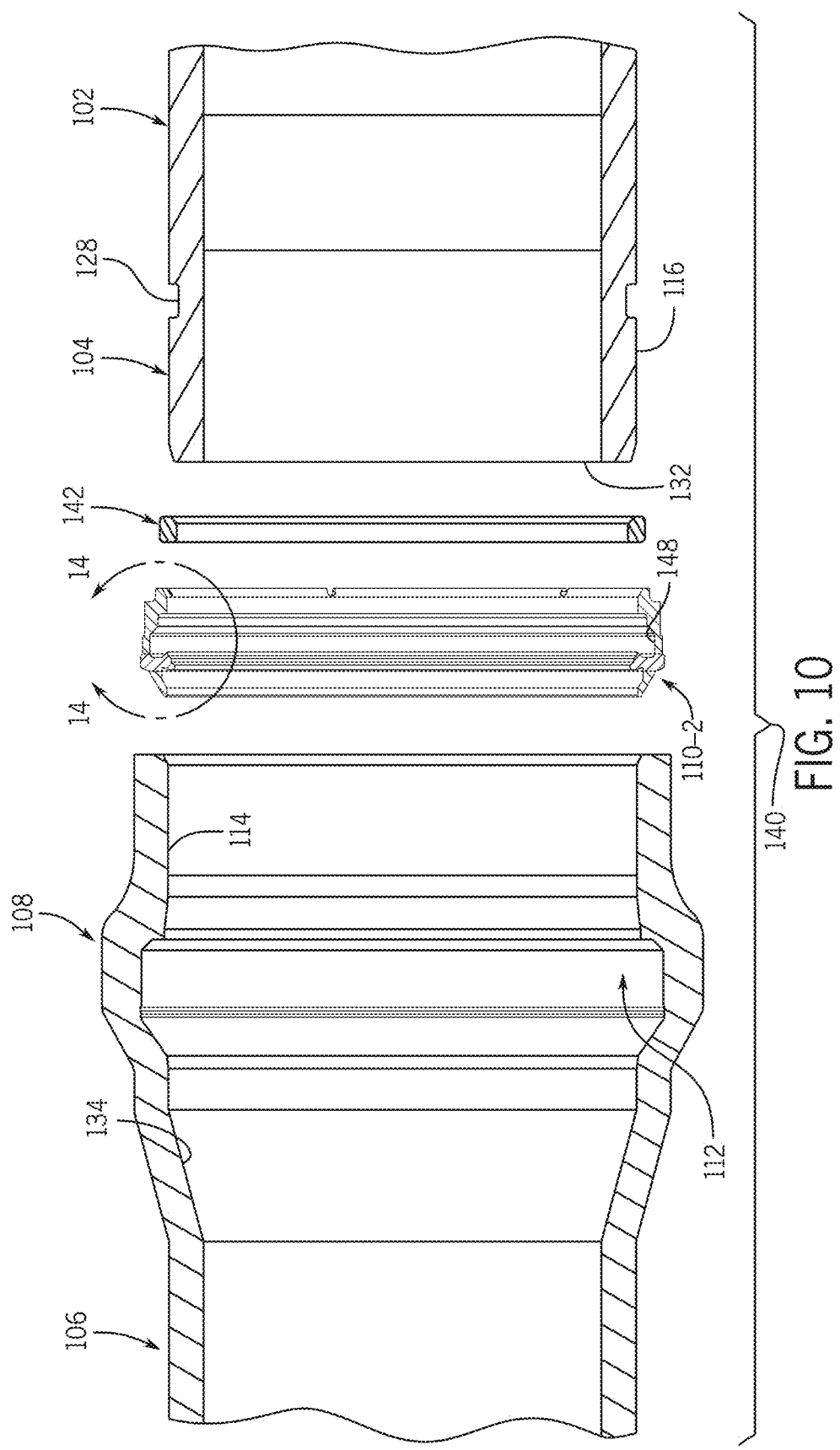
FIG. 10 shows a cross-section view taken along line 10-10 of the pipe joint assembly of FIG. 9.
Figure 14:
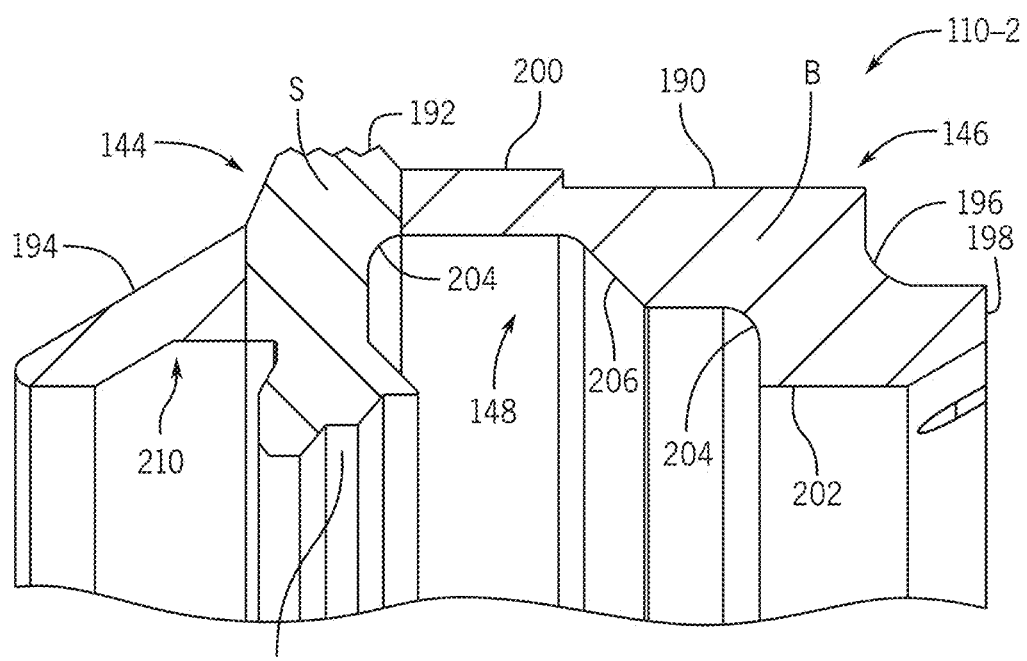
FIG. 14 shows a close up cross-section view of a portion taken from line 14-14 of the insert device of FIG. 10 depicting one example of an insert device constructed in accordance with the teachings of the present disclosure.

FIGS. 9 and 10 show the components of the pipe joint assembly 140 in exploded view, including the insert device 110-2, the split-ring spline 142, the spigot 104 of a first pipe 102, and the belled end 108 of a second pipe 106. In this example, the insert device 110-2 includes a body B having a seal portion 144 and a spline groove portion 146 with a dual-depth spline groove 148, as shown in FIG. 14. The belled end 108 of the second pipe 106 may again be formed using the below-described process with the insert device 110-2 pre-disposed or pre-installed within the belled end. The spigot 104 of the first pipe 102 is again formed having a spline groove 128 in the OD surface 116. In this example, the spline 142 is a radially expandable split ring that seats in the aligned spline grooves 128, 148 and allows assembly of the two pipes 102, 106, as described further below, but does not permit disassembly of the two pipes, i.e., the pipe joint assembly 140.

Figure 15:
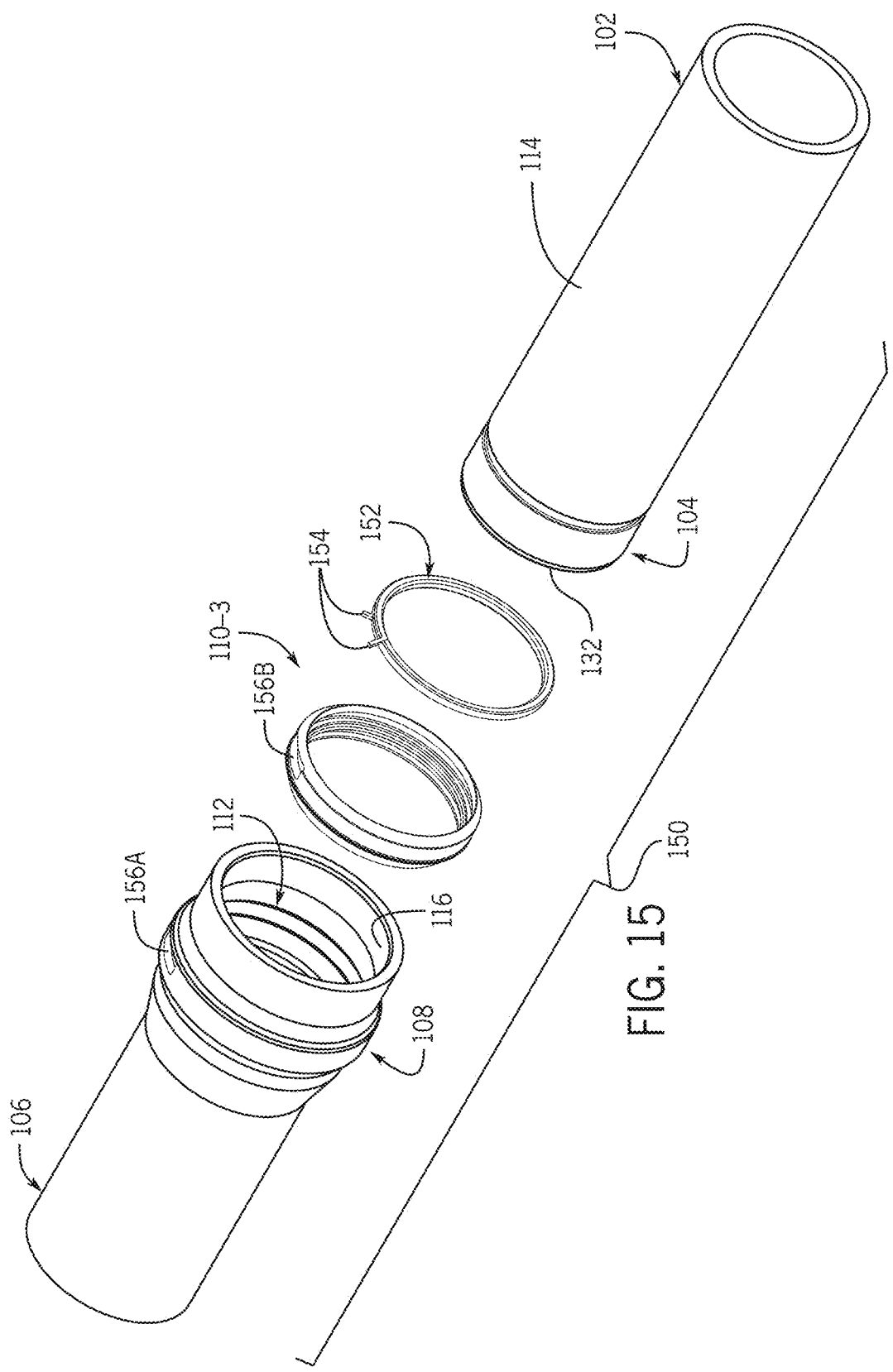
FIG. 15 shows an exploded view of another example of a pipe joint assembly including an insert device constructed in accordance with the teachings of the present disclosure.

FIG. 15 shows another example of a pipe joint assembly 150 that utilizes a radially expandable, split-ring, Certa-Lok®CLIC™ type spline 152 and an insert device 110-2 similar to the device used in the pipe joint assembly 140 of FIG. 14. FIG. 15 again shows the components of the pipe joint assembly 150 in exploded view, including the insert device 110-2, the split-ring spline 152, the spigot 104 of a first pipe 102, and the belled end 108 of a second pipe 106. In this example, the insert device 110-2 again includes the body B with the seal portion 144 and the spline groove portion 146 with the dual-depth spline groove 148. The belled end 108 of the second pipe 106 may again be formed using the below described processes with the insert device 110-2 pre-disposed or pre-installed within the belled end.

In this example, the spline 152 is again of a split ring type, but also in this example has actuation or release tabs 154 connected to each of the free ends, which circumferentially overlap one another, of the split ring spline. The spigot 104 of the first pipe 102 is again formed having the spline groove 128 in the OD surface 116. In this example, the spline 152 is radially expandable by actuating or pinching the release tabs 154 toward one another. The spline 152 seats or is captured in the aligned spline grooves 128, 148 and allows assembly of the two pipes, as described further below, and also allows for disassembly. The belled end 108 of the second pipe 106 and the insert device 110-2 in this example include tab openings 156a, 156b, which expose the release tabs 154 of the split ring spline 152 to the exterior of the pipe joint assembly 150 (not shown).

For the pipe joint assemblies 140 and 150 in either example of FIGS. 9-13 or FIG. 15, the spline groove 148 in the insert device 110-2, as shown in FIG. 14, has a first groove section 158 having a shallower radial depth and a second groove section 160 having a deeper radial depth. The first groove section 158 is disposed axially closer to a distal end 162 of the second pipe 106 and the second groove section 160 is disposed axially further from the distal end of the second pipe. In each of these embodiments, the splines 142 and 152 are pre-installed within the spline groove 148 of the insert device 110-2. The splines 142 and 152 in a relaxed state each have a diameter that keeps the splines captured within the spline groove 148 of the insert device 110-2 and sized to correspond to the shallower radial depth of the first groove section 158. Each of the splines 142 and 152 may have a chamfer 164 or angled corner surface on the radial inner side of the spline and on the axial side that faces toward the distal end 162, and thus the incoming spigot 104. Likewise, the distal end 132 of the spigot may also have a chamfer 166 or angled surface on the radial outer edge of the distal end surface.

Figure 11:
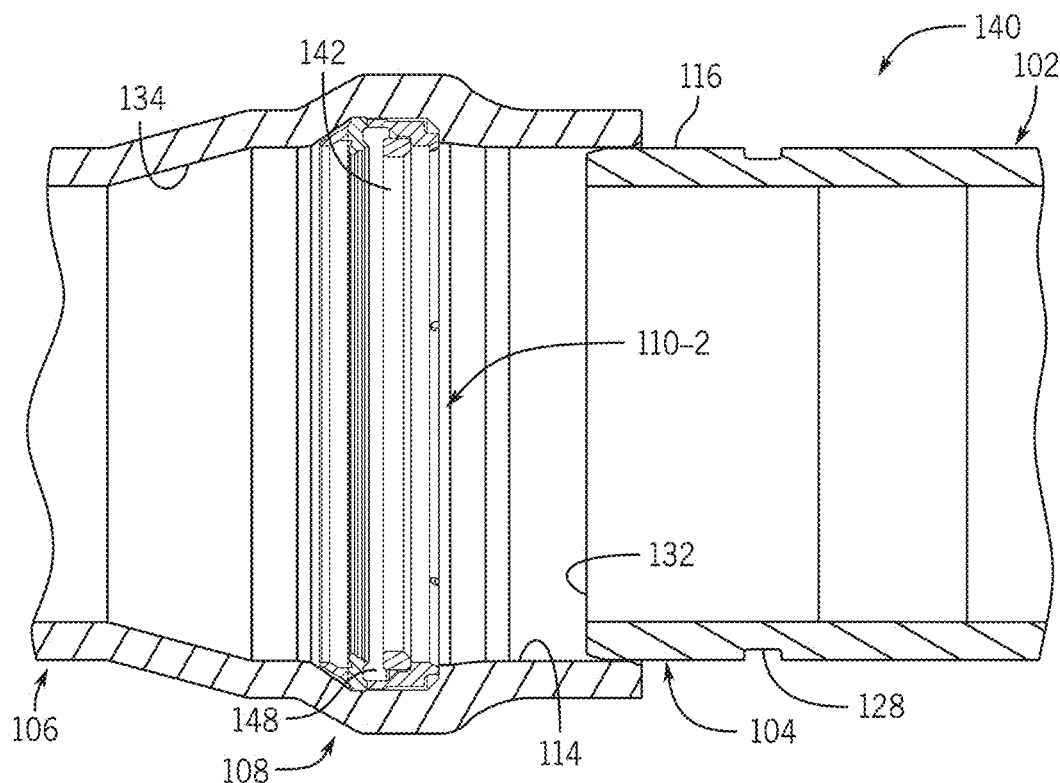
FIGS. 11-13 show views of the pipe joint assembly of FIG. 10 in progressive stages of being assembled.
Figure 12:
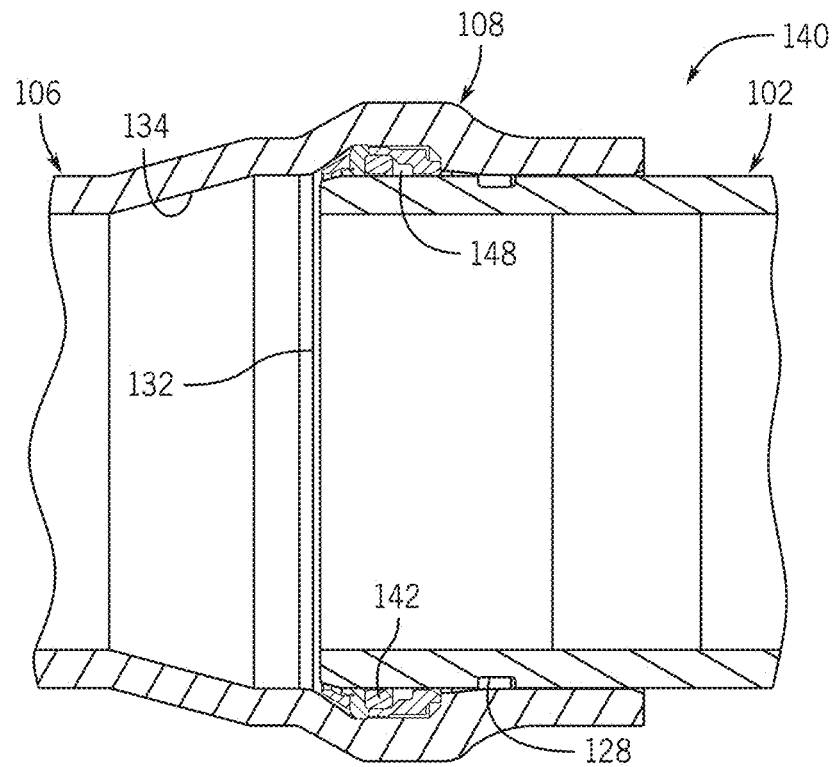
Figure 13:
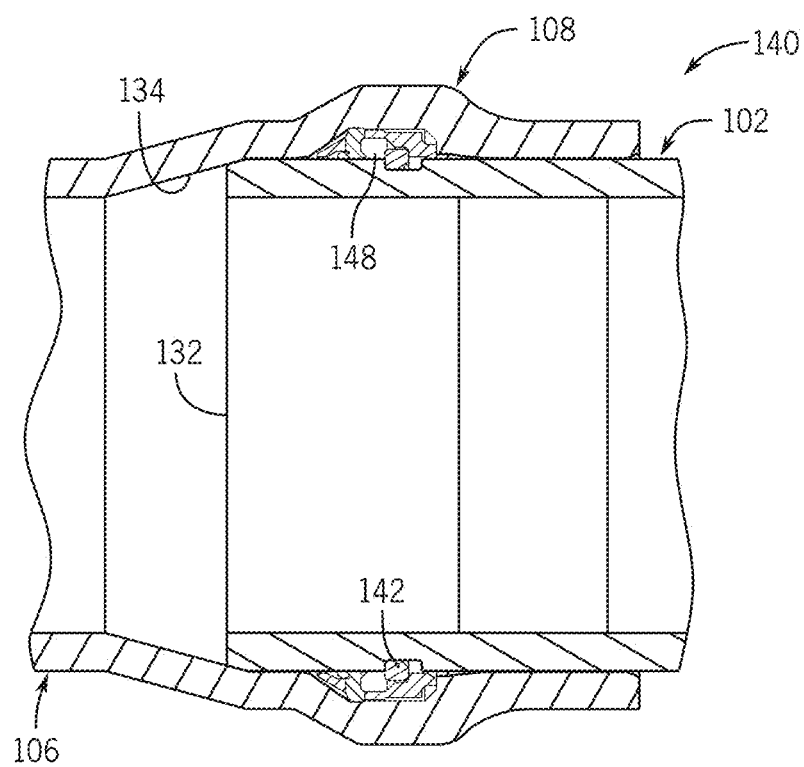

To form the pipe joint assemblies 140 and 150, the spigot 104 of the first pipe 102 is inserted into the belled end 108 of the second pipe 106 and pushed inward, as shown in FIG. 11. The distal end 132 of the spigot 104, such as the chamfer 166 will contact the chamfer 164 on the spline 142 or 152 and force the spline to move axially to align with the second deeper groove section 160 of the spline groove 148. The spigot 104 will also force the spline 142 or 152 to radially expand upon contact with the OD surface 116 of the first pipe 102, as shown in FIG. 12. Once aligned with the spline groove 128 in the OD surface 116 of the spigot 104, the spline 142 or 152 will be permitted to radially retract into the spline groove of the spigot, as shown in FIG. 13. Once retracted, the spline 142 or 152 is captured within the two spline grooves 128, 148. The spline 142 or 152 and spline grooves 128, 148 prevent the two pipes 102, 106 from being pushed further together. The shallower depth first groove section 158 of the spline groove 148 in the insert device 110-2 prevents the spline 142 or 152 from radially expanding when the two pipes 102, 106 are pulled apart, as shown in FIG. 13, thus preventing the two pipes from being pulled apart. However, in the example of FIG. 15, a user can manually close the release tabs 154 on the spline 152 to expand the spline into the depth of the deeper groove section 160 of the spline groove 148 in the insert device 110-2. This allows the spline 152 to clear the spline groove 128 in the OD surface 116 of the first pipe 102, which allows the two pipes to be pulled apart with reverse reference to FIGS. 11-13.

Thus, in some examples, the spline 120 is an elongate plastic strip, i.e., an extruded spline that is inserted into a space formed by corresponding grooves in the overlapping ends of the two pipes. In some examples, the extruded spline is inserted through a hole in the female end of the second pipe into the space and is captured within the corresponding grooves. The spline interlocks the two pipes together by preventing the two pipe sections from moving axially relative to one another. The spline can be withdrawn from the space within the aligned grooves via the hole to unlock the joint assembly and permit separation of the two pipes.

In other examples, the spline 142 or 152 is a split plastic ring that is circumferentially expandable and contractable but is pre-installed before the pipes are assembled. This type of spline may include tabs 154 accessible from the exterior of the pipes to manipulate and expand the spline. The spline is received in a space formed by corresponding grooves in the overlapping ends of the two pipes. One of the grooves, in this case the groove 148 in the insert device 110-2 within the female or belled end 108 of the second pipe 106, has a shallow locking section 158 and a deeper release section 160. The spline 142 or 152 will be seated in the shallow section 158 of the spline groove 148 and will thus seat in the other spline groove 128 of the first pipe 102 as well, when the pipe joint assembly is pulled apart in a separation direction. In the shallow section 158, the spline 142 or 152 cannot be expanded radially and lies in part in each of the two spline grooves 128, 148, which axially interlocks the two pipes together. If the two pipes 102, 104 are pushed together, the spline will align with the deeper section 160 of the spline groove 148 of the insert device 110-2 in the second pipe. This permits the spline 152 to expanded via the release tabs 154 into the deeper section, which withdraws the spline from the spline groove 128 in the first pipe 104. If the spline is maintained in this position, the two pipes can be pulled apart and separated. These spline locking arrangements are known in the art. The type shown in FIGS. 9-13 and as described above is produced as the Certa-Lok®

CLIC™ PVC pipe interlocking system produced by North American Pipe Corporation, the assignee of the present disclosure. The other types are also produced and sold by the assignee of the present disclosure.

According to the above described pipe joint assembly examples, the insert device configuration and construction can vary. Details of the insert devices can vary within the spirit and scope of the present disclosure, as will become evident upon reading the written description and reviewing the several examples disclosed and described herein. In the example of FIG. 8, described only briefly above, as well as other examples shown and described herein, the insert device 110-1 includes a relatively stiff or rigid, annular, circular, or ring-shaped base or body B (i.e., the annular body) and a seal part S joined to, connected to, or carried by the annular body. The seal part S may be made from a suitable seal material, which may be different from and likely softer than the material of the annular body B. In this example, the spline groove portion 126 has a generally flat outer or OD surface 170, other than an OD seal portion 172 of the seal S that extends radially beyond and is exposed on the OD surface. The annular body B of the insert device 110-1 of FIG. 8 has a tapered face 174, i.e., a leading edge or end, on the seal portion 124 at one end, i.e., a pipe insertion end, of the annular body and an opposite tapered face 176 at the other end of the body. The annular body B of the insert device 110-1 may be said to have a "one-hump" or "single hump" configuration, based on the generally flat nature of the outer or OD surface 170.

In this example, the spline groove 118 is formed into an ID surface 180 of the spline groove portion 126 and has a generally rectangular cross-section, but with rounded corners 178 at the depth of the groove. The seal 122 of the seal part S is exposed to and extends inwardly beyond the inner or ID surface 180 of the annular body B. The seal 122 in this example is an angled wiper seal that engages the outside surface 116 of the first pipe 102 in the pipe joint assembly 100 and compresses as the first pipe is inserted. The annular body B also has a void 182 on the inner side of the tapered face 174 and axially adjacent the seal 122. The void 182 can help reduce material usage for the annular body B and reduce surface contact and thus sliding friction, if any, as the first pipe 102 is inserted into the second pipe 106 during assembly of the pipe joint. The void 182 can also provide room for the seal to move freely in the direction of the void as the pipes 102, 106 are joined. The disclosed insert device 110-1 provides both the spline groove function and seal function in the same component. This limits the need to cut a spline groove on the inside surface 114 of the belled end of the pipe 106, which can be difficult and costly and eliminates the need to install a separate seal within the joint.

The insert device 110-2 of FIG. 14 is generally similar to the insert device 110-1 of FIG. 8, but with some differences. In this example, the insert device 110-2 also includes a relatively stiff or rigid, annular, circular, or ring-shaped base or body B (i.e., the annular body) and a seal part S joined to, connected to, or carried by the annular body. The seal part S may again be made from a suitable seal material, softer than the material of the annular body B. In this example, the spline groove portion 146 also has a generally flat outer or OD surface 190, other than an OD seal portion 192 of the seal S that extends radially beyond and is exposed on the OD surface. The annular body B of the insert device 110-2 of FIG. 14 has a tapered face 194 on the seal portion 144 at one end, i.e., a pipe insertion end, of the annular body and an opposite face with a scallop 196 or recess between the outer surface 190 and a flat, radially extending face 198 at the other end of the body. The annular body B of the insert device 110-2 may again be said to have a "one-hump" or "single hump" configuration, based on the generally flat nature of the outer or OD surface 190. However, in this example, the outer surface 190 has a higher plateau 200 that protrudes further radially outward than the rest of the surface.

In this example, the spline groove 148 is formed into an inner or ID surface 202 of the spline groove portion 146. In this example, the spline groove 148 includes the shallower first groove section 158 and the deeper second groove section 160. Each groove section 158, 160 has a rounded corner 204 at opposite ends of the spline groove 148 at the depth of the respective section. A tapered or angled transition surface 206 extends between the two grove sections 158, 160. A seal 208 of the seal part S is exposed to and extends inwardly beyond the inner or ID surface 202 of the annular body B. The seal 208 in this example is similar to the above described seal 122 of the insert device 110-1. However, in this example, the OD seal portion 192 is thicker and protrudes further radially outward in comparison to the seal portion 172 of the insert device 110-1 and one side is exposed on the tapered face 194 radially below the height of the plateau 200 and OD or outer surface 190. The annular body B in this example also has a similar void 210 on the inner side of the tapered face 194 and axially adjacent the seal 208.

With respect to the insert devices disclosed herein, in one example, the annular body B may be formed from a polymer. In some examples, the polymer may be at least one of polypropylene (PP), high density polyethylene (HDPE), Acetal, Delrin, Nylon, flexible polyvinyl chloride (PVC), or the like. In other examples, the polymer may include at least one reinforcing material or fiber, such as glass, carbon, fibers, talc, a structural filler, or the like. In one example, the annular body B can have a modulus of elasticity in a range of about 1E9 N/m$^2$ to about 4E9 N/m$^2$. The annular body B may include an axis, an ID, and an OD. The annular body B may also have an axial length depicted in each of FIGS. 2-8.

Also, A with respect to the insert devices disclosed herein, in one example, the seal part S, i.e., the seal, may be formed of a seal material such as an elastomer. The seal S is also formed having a circular, annular, or ring shape and is coaxial with the annular body B. In one example, the seal material can be connected to one axial end of the annular body B as the seal portion of the body. In other examples, such as the insert devices 110-1 and 110-2, the seal part S can be formed as a part of or connected to the seal portion 124 or 144 of the body B and be axially spaced from an end of the body, as shown in FIGS. 8 and 14. In many examples, the seal material of the seal S can extend radially though the annular body B, as in FIGS. 8 and 14, or can be received in a pocket formed around the annular body (not shown herein). Portions of the seal S may be exposed on the ID surface of the insert device, on the OD surface of the insert device, or both, as in FIGS. 8 and 14, to create a fluid tight seal within the pipe joint assembly. In some examples, the seal material, such as the elastomer, of the seal S may be formed of at least one of an isoprene rubber (IR), a styrene butadiene rubber (SBR), an IR/SBR blend, a nitrile, an ethylene propylene diene monomer (EPDM) rubber, Viton, or the like. In some applications, the seal S may be made from an elastomer that may satisfy the chemical compatibility requirements of ASTM standard F477 for elastomer seals for plastic pipe joints. In an example, the seal S is less rigid than the annular body B and may have a hardness in a range of about 40 Shore A to about 80 Shore A.

The insert devices as disclosed herein, including the annular body B and the seal S, are not intended to be limited to any specific materials or material types. The material of both the annular body B and the seal S may vary within the scope of the present disclosure and may vary from the limited examples mentioned herein.

Embodiments of the insert device are configured to be installed in an interior of a polymer tube, such as an end of a PVC pipe or in a PVC pipe coupling, i.e., the second pipe in the disclosed examples. In addition, the installed insert device in some embodiments may form a seal between the insert device and the interior surface 114 of the second pipe 106. In the various disclosed examples, the insert device is also configured to form a seal between the insert device and the exterior surface 116 of another pipe or coupling, i.e., the first pipe 102 in the disclosed examples. In an example, when the insert device is installed in a pipe joint assembly between the first and second pipes 102, 104, the seal S may experience a degree of compression to form the liquid tight seal. In one example, the seal S may experience a compression ratio of about 10% to about 35%. This ratio may be different within different pipe joint arrangements and depending on the specific seal S and annular body B configuration of a given insert device. As used herein, compression ratio may be defined as a percentage of the seal S that changes shape from uncompressed to compressed in use within a pipe joint assembly.

In some examples, the insert device may be sized for a wide range of pipe diameters. This range may be between about 3 inches OD to about 48 inches OD, though other sizes are certainly possible. Further, the axial length of the insert device and the seal S can also vary within a wide range of sizes. In one example, the insert device, or the seal S, may have an axial length of about of about 0.125 inches to about 3 inches.

FIGS. 16-22 show examples of different or modified insert devices of the "one hump" or "single hump" type. These examples are provided to show some of the many design modifications and changes one can make to the insert device within the spirit and scope of the disclosure. Such modifications are not intended to be limited to only those disclosed herein but are instead meant only to illustrate that a wide range of modifications are possible. In the following examples, only the notable differences between these examples and the earlier described examples are noted.

Figure 16:
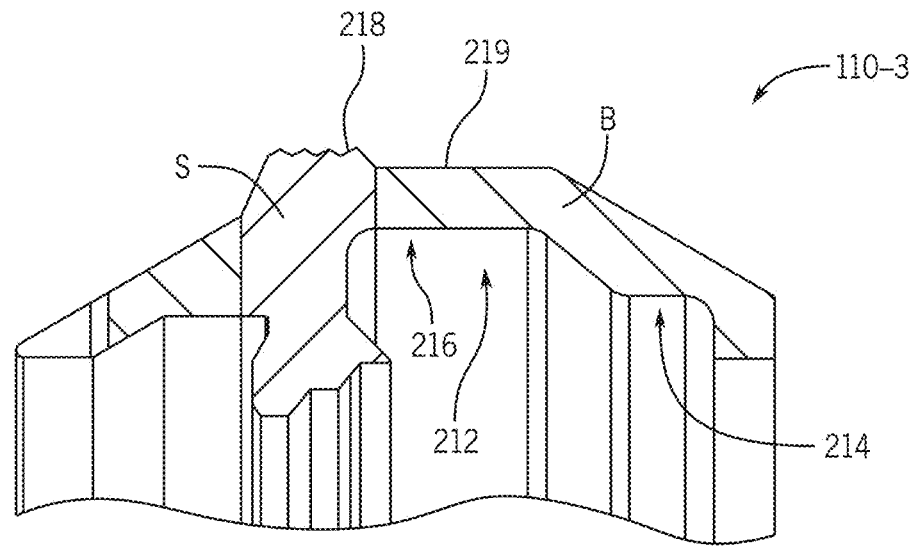
FIGS. 16-34 each show close-up cross-section views of additional examples of portions of insert devices constructed in accordance with the teachings of the present disclosure.

FIG. 16 shows an insert device 110-3 that is substantially similar to the insert device 110-1, but for the spline groove of the annular body B and the seal part S. In this example, the insert device 110-3 has a spline groove 212 with a first shallower groove section 214 and a second deeper groove section 216, similar to the spline groove 148 and sections 158, 160 on the insert device 110-2. Also, in this example, the seal part S has an outer or OD seal 218 that protrudes further from the radial outer surface 219 of the body B.

Figure 17:
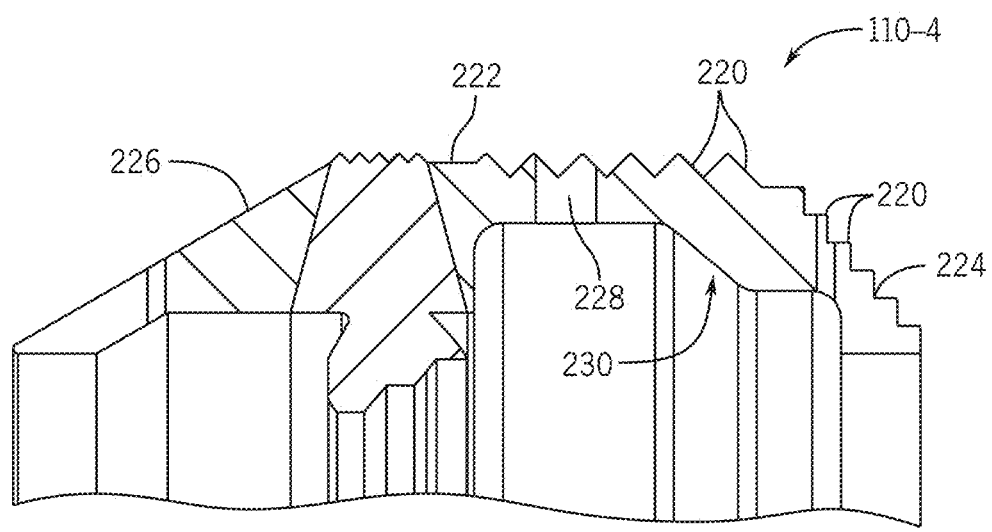

FIG. 17 shows an insert device 110-4 with one or more annular ribs or protrusions 220 extending around the OD surface 222 and over the opposite tapered surface 224 of the annular body B. The ribs 220 are not on the tapered face 226, which would otherwise hinder installation of the insert device within the second pipe 106 during formation of the belled end 108, as illustrated further below. These plastic ribs 220 may penetrate the material of the ID surface 114 of the second pipe 106 into which the insert device is installed during assembly because the material will be hot enough to allow penetration. Such ribs 220 can thus form an axial mechanical link, i.e., by creating bite via a radial overlap between the material of the annular body B and the material of the pipe 106 into which it is installed. The insert device 110-4 also has a wedge shaped seal part S that is wider on the ID side than on the OD side relative to the annular body B. The annular body B also has holes 228 formed therethrough around the circumference of the insert device 110-4 and within a spline groove 230 of the body B. These holes 228 can allow a vacuum or negative pressure to be applied to an ID surface of the belled end 108 of a pipe when the belled end is formed to further assist in forming the recesses or grooves 112 within the pipe to retain and conform to the shape of the insert device, as described in further detail below. Also, in the insert device 110-4, the end wall 232 of the deeper groove section 160 of the spline groove 230 is defined by the rigid plastic material of the body B. In contrast, an end wall 234 of the deeper groove section 160 of the spline groove 148 in the insert device 110-2 is formed by an exposed side of the seal part S.

Figure 18:
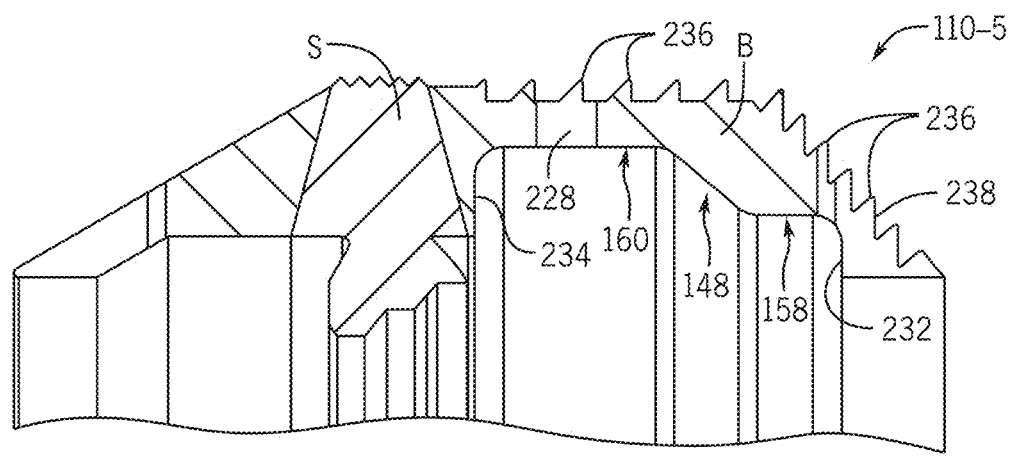
Figure 19:
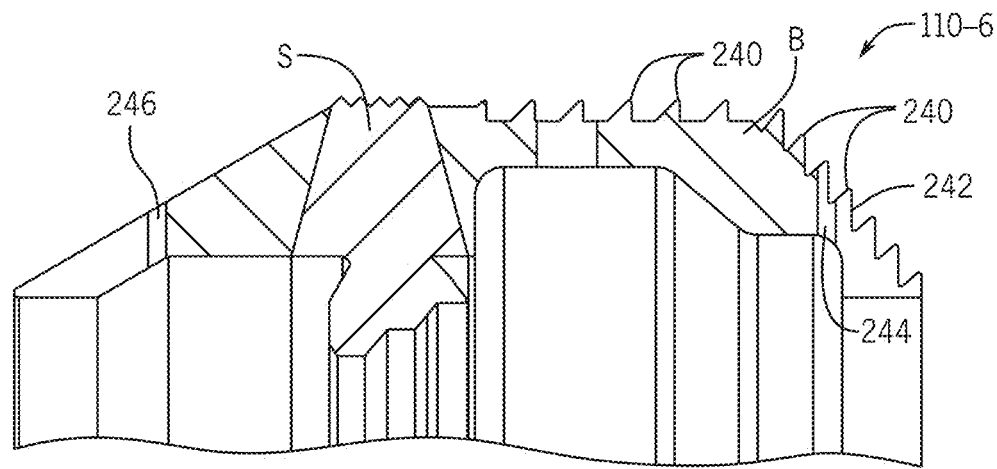

FIGS. 18 and 19 show insert devices 110-5 and 110-6, respectively, that are very similar to the insert device 110-4. The differences lie in the material thicknesses of portions of the annular body adjacent the shallower first groove section 158 at the opposite tapered surface and the shape, angle, and number of the ribs. On the insert device 110-4, the ribs 220 are formed more like steps on the opposite tapered surface 114. Ribs 236 on an opposite tapered surface 238 of the insert device 110-5 and ribs 240 on an opposite tapered surface 242 of the insert device 110-6 are angled more radially outward. Further, the axial lengths and radial shapes of the insert devices 110-4, 110-5, and 110-6 vary from one to the other. Also, additional vacuum holes 244 and 246 can also be provided through other parts of the annular bodies B of these insert devices.

Figure 20:
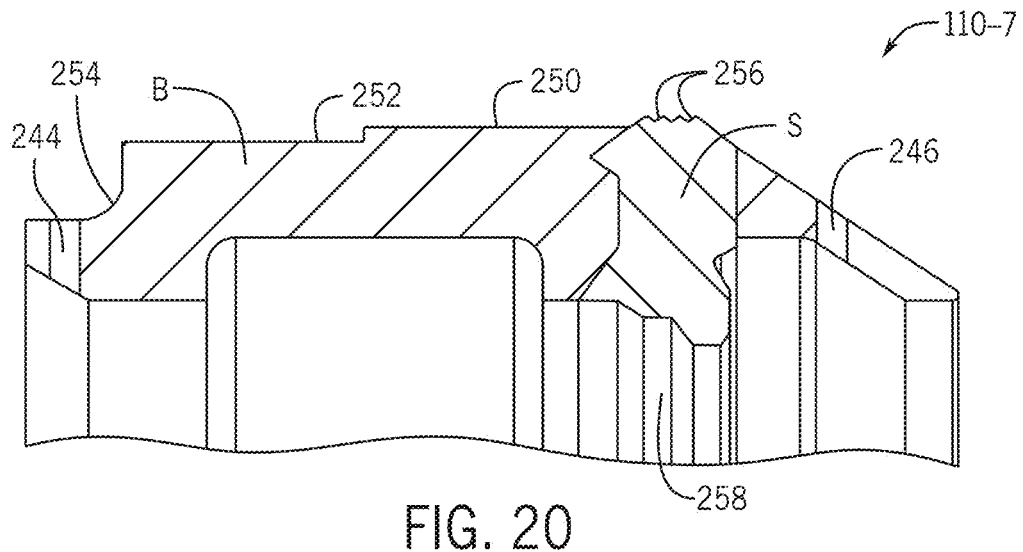

FIG. 20 shows another example of an insert device 110-7 with an annular body B having vacuum holes 244 and 246 through both axial ends of the body. In this example, the body B has a plateau 250 on the outer or OD surface 252 and has a scallop 254 on the opposite end and has a single depth spline groove 256. The seal part S also has two protrusions or ribs 256 that extend into the material of the annular body B, which can increase the strength of the connection and bond therebetween. A seal 258 of the seal part S also has a different shape from prior examples, in that only a trailing end of the seal can flex relative to the main portion of the seal part.

Figure 21:
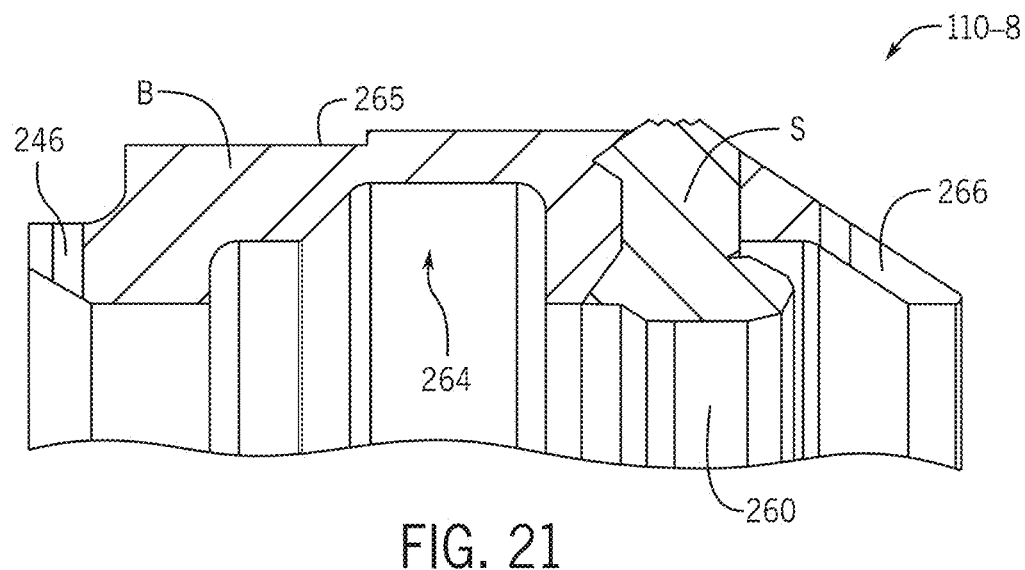
Figure 22:
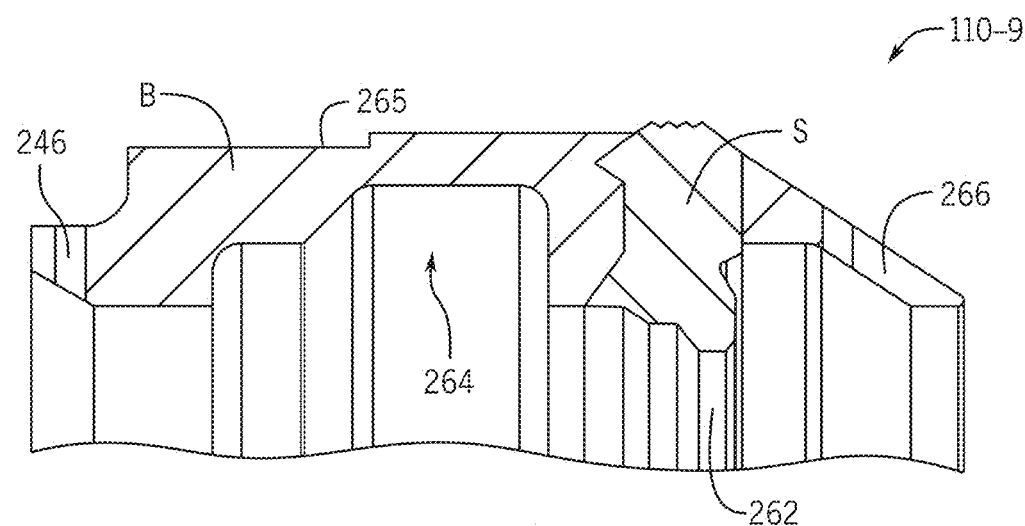

FIGS. 21 and 22 show further examples of insert devices 110-8 and 110-9, respectively, that are similar to the insert device 110-7. In these examples, each has a seal 260 and 262, respectively, that is different in shape from the seal 258. Also, a thickness of the annular body B between the depth of a spline groove 264 and an outer or OD surface 265 on the insert devices 110-8 and 110-9 is thinner than on the insert device 110-7. In these examples, as well as in earlier examples, the axial edges of the annular body B may also have slits or slots 266 formed around the periphery to create some flexibility in the insert device.

Referring to FIGS. 23-34, the annular body B in other disclosed insert device examples has at least two distinct annular portions that are spaced axially apart from one another, i.e., has "two humps" when viewed relative to an OD surface of the insert device. The annular portions in these examples are integrally formed together as part of a monolithic or unitary annular body B but are two distinct portions. In the prior "one hump" or "single hump" examples, the seal and spline portions of the body are distinguishable only by their function but otherwise the annular body has one relatively rigid part. In these two hump examples, the first annular portion is a spline groove portion and the second annular portion is a seal portion and these two portions are much more distinct from one another.

Figure 23:
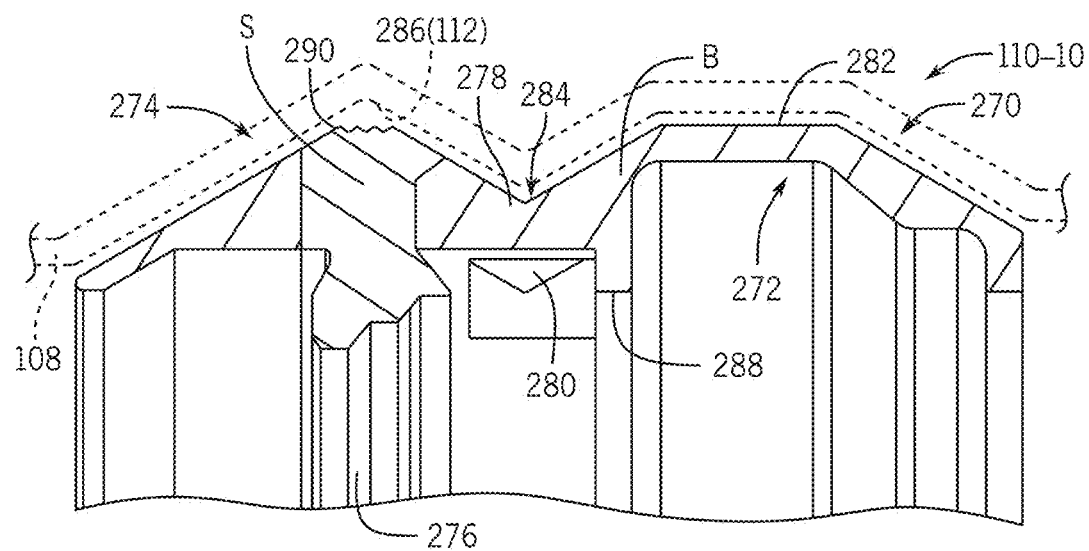

Referring to FIG. 23, an insert device 110-10 is shown wherein a spline groove portion 270 defines an annular spline groove 272 that faces radially inward and extends around the annular body B. The annular spline groove creates a part of the above-mentioned locking space for receiving a spline to interlock the two pipes. The other part of the locking space is created by a spline groove formed in the outer surface 116 of the first pipe 102, as noted above. In the example of FIG. 23, the annular spline groove 272 is of the type noted above with a first shallow groove section 158 and a second deep groove section 160. A seal portion 274 of the annular body B is configured to carry or be connected to the seal part S of the insert device 110-10. As with most examples disclosed and described herein, the seal portion 274 and the seal part S may be co-molded with one another so that a seal 276 is formed as an integrated or monolithic part of the insert device 110-10, along with the annular body B.

With continued reference to FIG. 23, the two annular portions 270, 274 in this example are connected to one another by a connecting portion 278 disposed between the two annular portions. The connecting portion 278 may be formed as a plurality of bridges, ribs, or the like, separated or spaced apart by voids, openings, or holes 280 through the connecting portion. The connecting portion 278 may instead be formed as a substantially solid continuous structure. Smaller perforations may be formed in the connecting portion 278 instead of it being a completely solid structure or formed of intermittent bridges. The design of the connecting portion may vary, depending on the need to achieve a cost, material usage, and/or weight objective. The size, axial length, thickness, and the like, of the connecting portion may also vary, depending on the needs or design parameters of a given pipe joint assembly application. The seal part S of the insert device 110-10 of FIG. 23 has a seal 276 exposed on the radially inner side of the annular body B that is similar to above described examples and has an outer or OD seal 278 exposed and protruding relative to an outer or OD surface 282 of the annular body B.

In other examples, the annular body may include the annular seal and spline groove portions joined directly to one another and may thus exclude the connecting portion. In still other examples, the annular body may include only a single annular portion, i.e., a single "hump." In some of those embodiments, the single annular portion may be configured to facilitate both the seal aspect or function and the spline groove function of the insert device. In other of those embodiments, the single annular portion may include only the spline groove function. Single hump type examples are disclosed and described above. Such single annular portion embodiments would require only a single groove or recess on the interior of a pipe instead of two such grooves or recesses, as also discussed further below.

In the example of FIG. 23, the annular body B is formed having a cross-section profile that creates at least one change in radial height in an axial direction on the body and between the two axial ends of the body. This aids in creating an axial positioning and locking mechanism to position the insert device 110-10 at a desired axial or lengthwise location along the length of the pipe joint assembly and aids in retaining the insert device in the desired axial position once the pipe joint is assembled. In the disclosed example of FIG. 23, the connecting portion 278 has a shorter radial height dimension than that of the annular spline groove portion 270 and the annular seal portion 274 on the annular body B. Thus, the outer surface 282 of the insert device 110-10 in this example has an M-like shape with a valley or trough 284 defined by the connecting portion 278 between the annular seal and spline groove portions 274, 270. The inner surface 114 of the belled end 108 on the second pipe 106 has a corresponding M shaped double insert recess 112 as depicted generically in FIG. 23. When installed, the insert device 110-10 seats in the insert recess or groove 112 and is captured between the first and second pipes 102, 106. The corresponding shape of the OD surface 282 of the insert device 110-10 and the insert recess or recesses 112 on the ID surface 114 of the belled end 108 of the second pipe 106 locates the insert device and axially retains the insert device in place when the pipe joint assembly is assembled.

The shape and configuration of the annular body B and the seal part S of the insert devices may vary from the examples shown and described herein and yet function as intended. The annular seal portion and the spline groove portion can each have their own unique size, shape, and configuration, independent of the other portion. Each portion can also take on any of the disclosed example shapes, regardless of the shape of the other portion. The seal part S, seal or seals, and seal material may also vary in size, shape, and configuration from the examples disclosed and described herein.

In one example, not shown herein, an insert device constructed in accordance with the teachings of the present disclosure may include a seal that is co-molded to an edge of the seal portion of the annular body. The seal can have a protruding seal element that is sized and configured to contact the male or spigot end 104 end of the first pipe 102 to create a seal thereat. The radial height of the spline groove portion may be larger than the radial height of the annular seal portion. Also, the trough or valley between the two portions may be relatively symmetrical between the two portions.

In the insert device 110-10 of FIG. 23, the seal material of the seal part S is over-molded to the seal portion 274 part of the annular body B. The over-molded seal material of the seal part S and the seal portion of the body may be considered together to form the annular seal portion 274 of the insert device 110-10. In this example, the seal material may be over-molded to both the ID and OD surfaces, or may pass through openings or holes in the seal portion of the body so that seal material is exposed on both the OD and ID surfaces of the seal portion 274 on the annular body B. The radial height of the spline groove portion 270 in this example is generally equal to the radial height of the annular seal portion 274. Also, the trough or valley 284 of the connecting portion 278, and thus the holes 280 as well, between the two portions are formed generally equidistant between the annular seal portion 274 and spline groove portion 270 in this example. Further, the radial inner seal 276 of the seal part S includes a protruding seal element in this example exposed beyond an ID surface 288. A radial outer or OD seal 290 of the seal part S is also exposed to the OD surface 282 on the annular body B. The surface of the OD seal 290 may have a plurality of circumferential and spaced part ribs around the insert device 110-10, as is also shown in the earlier insert device examples. This radial outer part of the seal can contact the ID surface 114 of the belled end 108 of the second pipe 106 to aid in creating a seal thereat.

Figure 24:
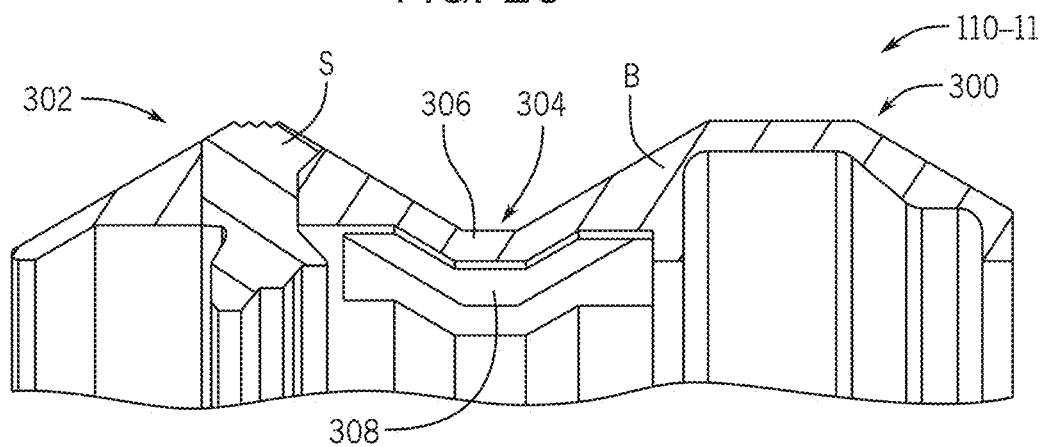

FIG. 24 shows another alternate example of an insert device 110-11 according to the teachings of the present disclosure. In this example, the radial height of a spline groove portion 300 is generally the same as the radial height of an annular seal portion 302. A trough or valley 304 of a connecting portion 306, and thus holes 308 as well, between the two portions are relatively symmetrical between the two portions. However, in this example, the valley 304 is wider, the connecting portion 306 is thinner in radial and axial directions, and the holes 308 are larger axially and circumferentially in comparison to the insert device 110-10.

Figure 25:
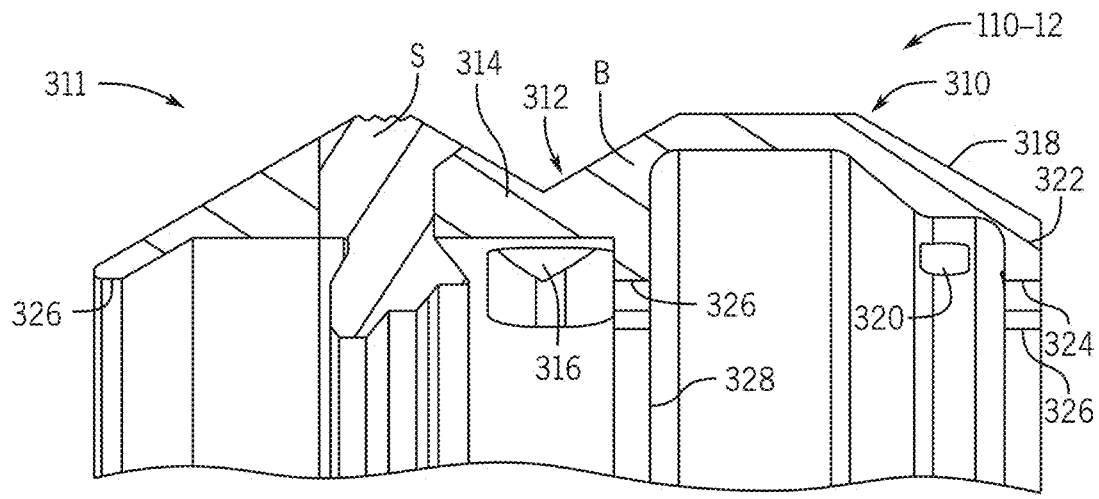

FIG. 25 shows another alternate example of an insert device 110-12 that is similar to the examples of FIGS. 23 and 24. However, in this example, the width in the axial direction of a spline groove portion 310 of the annular body B is wider than in the previous examples though the radial height is the same as that of a seal portion 311. A trough or valley 312 of a connecting portion 314, and thus holes 316 as well, between the two body portions is again relatively symmetrical. However, in this example, the valley 312 is narrower, the connecting portion 314 is thicker in the radial and axial directions, and the holes 316 smaller. In this example, an opposite tapered surface 318 at the trailing end of the body B has radially extending vacuum holes 320 and an axial facing end surface 322 has axially extending vacuum holes formed around the circumference of the insert device 110-12.

In the examples of FIGS. 23-25, the annular body B includes radial inward facing contact surfaces 326 that axially align with one another. These contact surfaces 326 may be defined, at least in part, by the axial ends of the annular body B but also by one or more circumferential, inward protruding rings, ribs, or flanges 328 on the body. In these examples, one of the flanges 328 may protrude from the seal portion or the spline groove portion of the body. One of the flanges 328 may define the axial facing end surface on the opposite end of the body B and one of the flanges may be provided at the end of the tapered face on the leading end of the body. These contact surfaces 326 will contact the outside surface 116 of the first pipe 102 in the pipe joint assembly and may also aid in the belling process, as described below.

Figure 26:
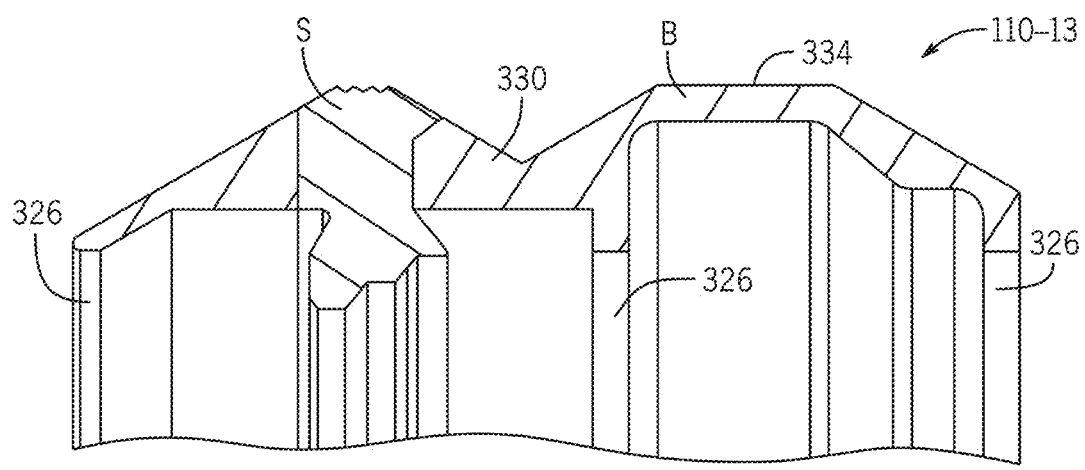
Figure 27:
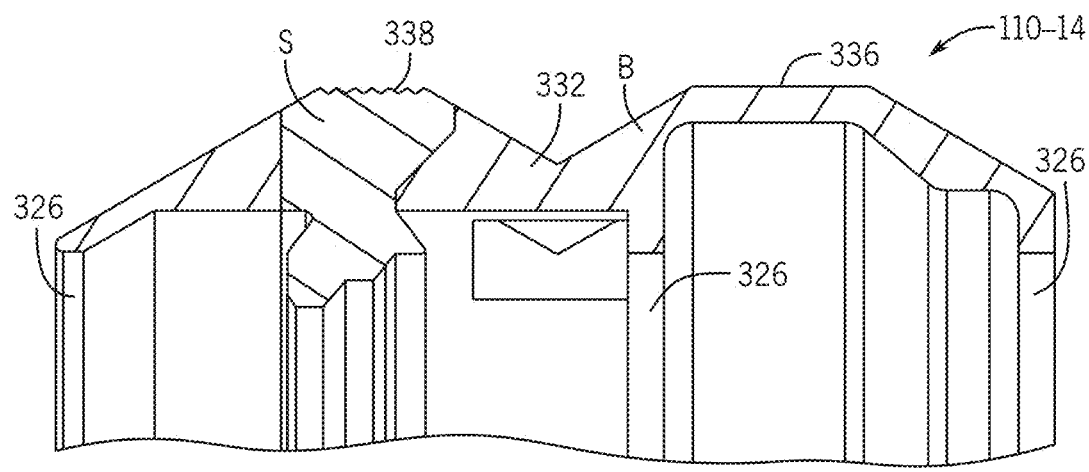

FIGS. 26 and 27 show further alternate examples of insert devices 110-13 and 110-14 with variations in the connecting portions 330 and 332, respectively. Further, the seal part S in each example is modified in size and shape, including at the outer or OD surfaces 334 and 336 of the two devices. In FIG. 26, the connecting portion 330 does not include holes, In FIG. 27, the exposed portion of an outer or OD seal 338 is wider than in previous examples.

Figure 28:
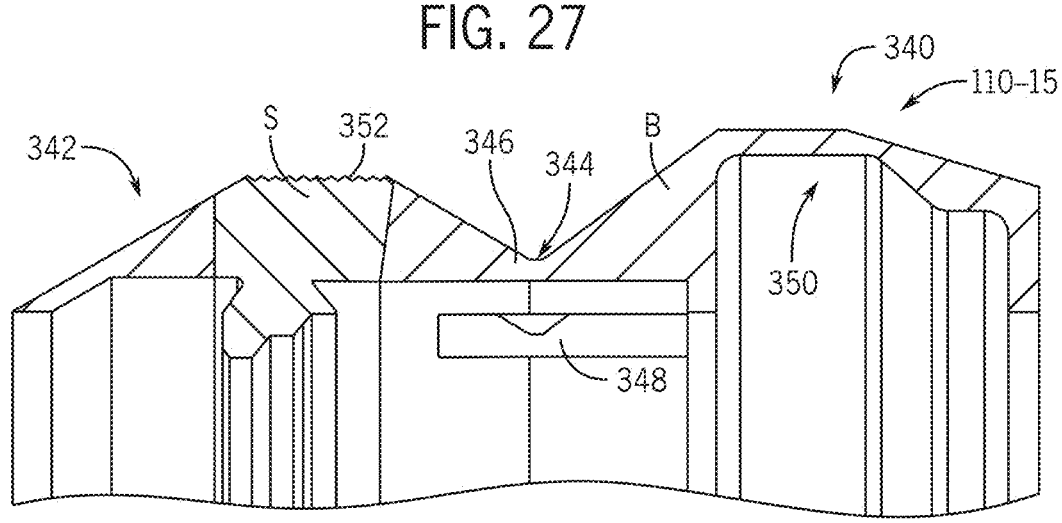

FIG. 28 shows another alternate example of an insert device 110-15 where the radial height of a spline groove portion 340 is larger than the radial height of an annular seal portion 342. Also, a trough or valley 344 of a connecting portion 346, and thus holes 348 as well, between the two portions are not relatively symmetrical between the two portions. In this example, holes 348 are axially longer and radially narrower, and the wall thickness of the spline groove portion 340 that defines a spline groove 350 is thinner or smaller than in the prior examples. The thinner wall may be provided to reduce the material usage for the insert device 110-15 where loads during use or during formation of the belled end 108 of a second pipe 106 may be relatively small. Further, an exposed outer or OD seal 352 of the seal part S in this example is axially wider than in many other examples.

Figure 29:
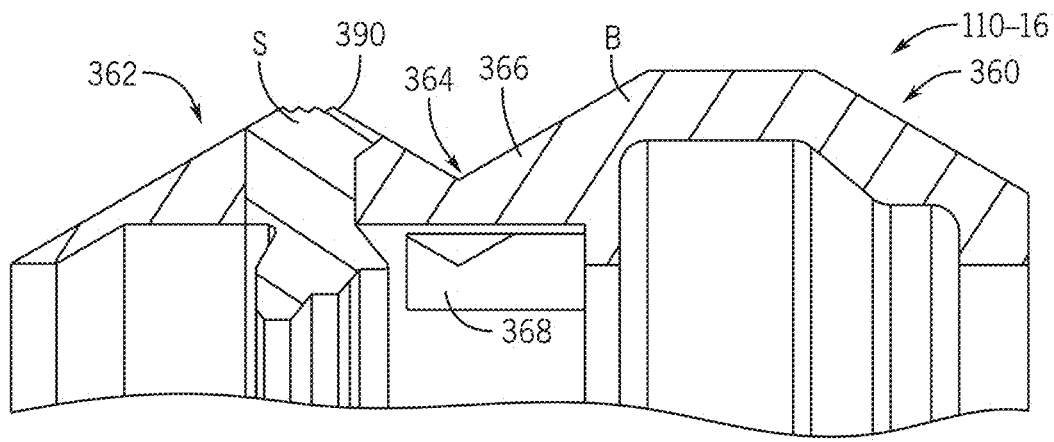

FIG. 29 shows another alternate example of an insert device 110-16 where the radial height of a spline groove portion 360 is larger than the radial height of an annular seal portion 362. Also, a trough or valley 364 of a connecting portion 366, and thus holes 368 as well, between the two portions are not relatively symmetrical between the two portions. In this example, the wall thickness of the spline groove portion 340 that defines a spline groove 350 is thicker or larger than in the prior examples. The thicker wall may be provided to better withstand heavier loads during use or during formation of the belled end 108 of a second pipe 106 and/or to increase durability or longevity of the insert device 110-16 in use.

Figure 30:
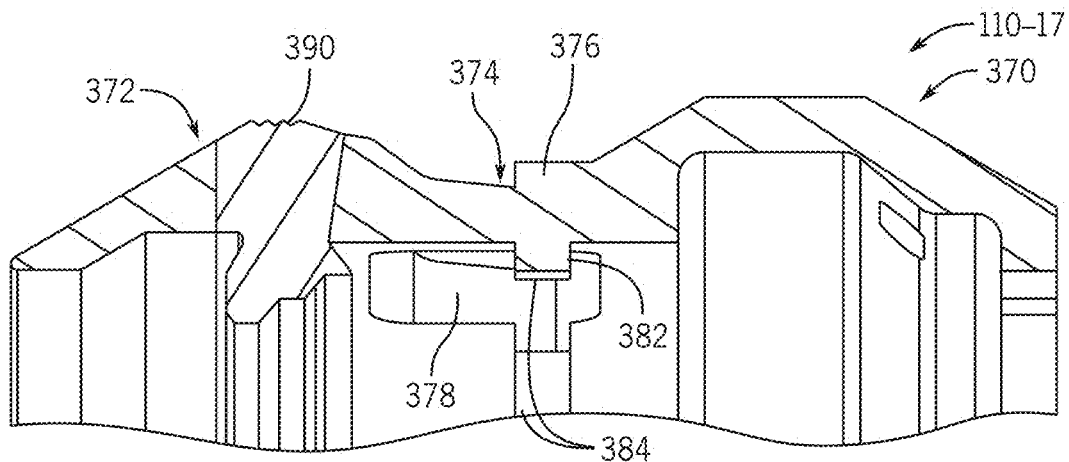
Figure 31:
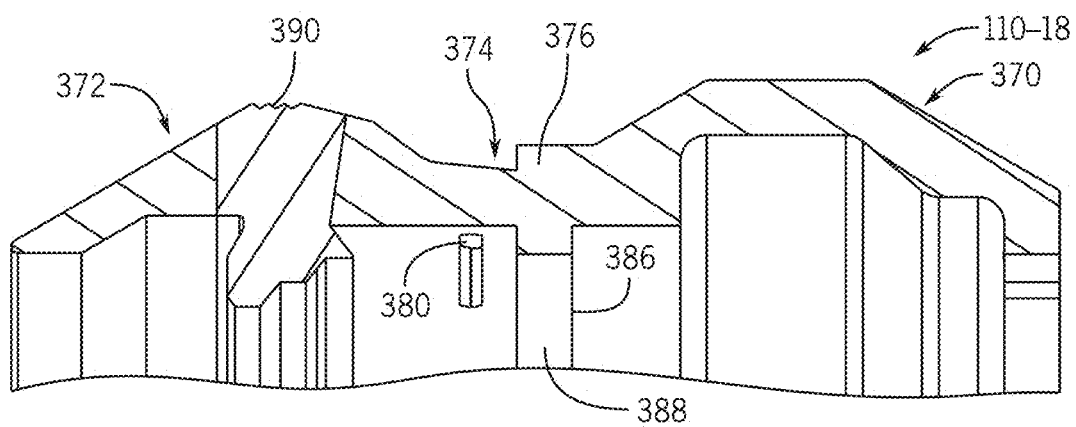

FIGS. 30 and 31 show still further examples of insert devices 110-17 and 110-18. In these examples, the annular bodies B are substantially identical. The radial height of a spline groove portion 370 is again larger than the radial height of an annular seal portion 372 in each example. Also, a trough or valley 374 of a connecting portion 376, and thus holes 368 or 380 as well, between the two portions are not relatively symmetrical between the two portions. In these examples, the holes 378 and 380 among the connecting portions 376 are quite different. The holes in the insert device 110-17 are much larger than the holes 380 in the insert device 110-18. In this example, the holes 378 create an intermittent rib or flange 382 around the inner surface 384 of the insert device 110-17 whereas the holes 380 permit a continuous flange 386 around the inner surface 388 of the insert device 110-18. In each of the examples of FIGS. 29-31, the seal part S has an outer or OD seal 390 with an exposed surface that is not flat but instead forms a peak on the respective annular seal portion. In such examples, the OD seal 390 may experience greater compression during use to create a suitable seal between the inside surface 116 of the pipe 106 and the insert device.

Figure 32:
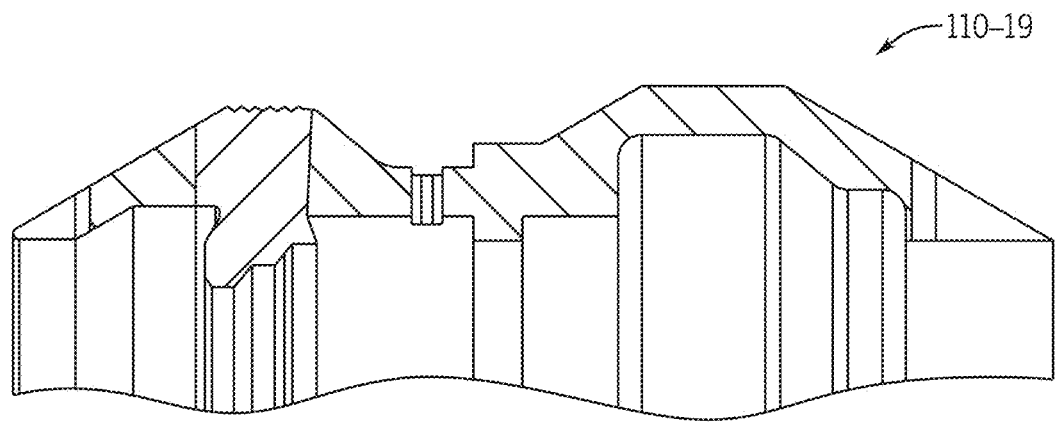
Figure 33:
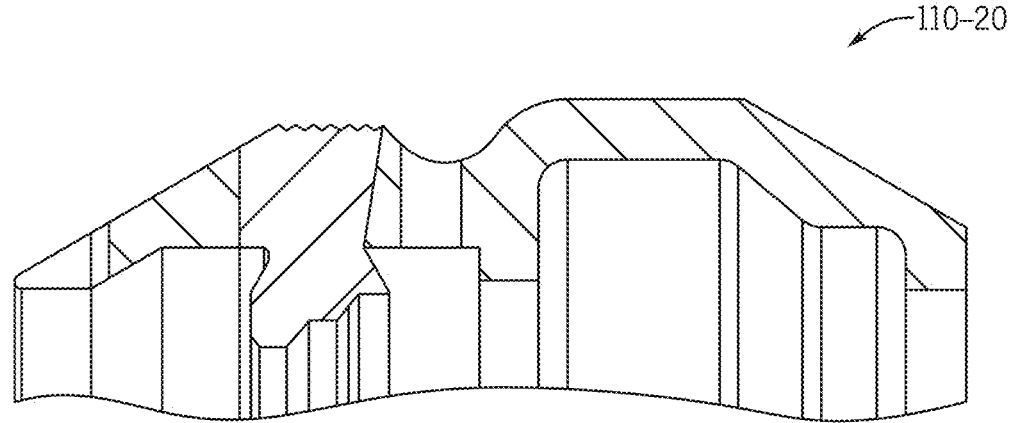
Figure 34:
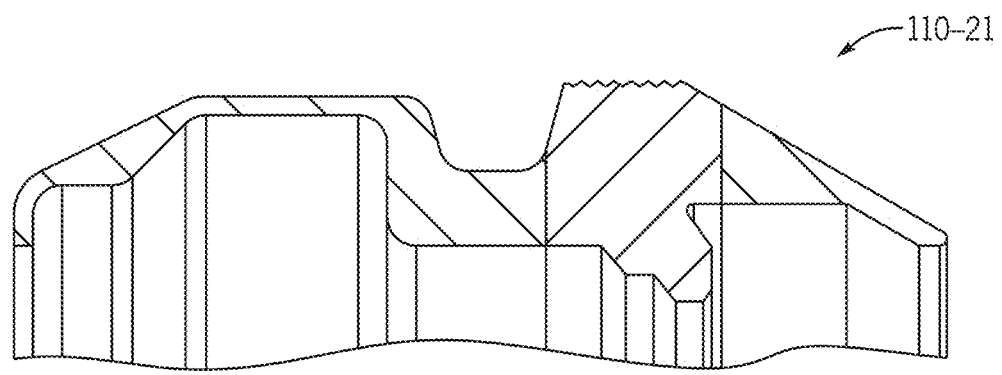

FIGS. 32-34 show still further examples of alternate insert devices 110-19, 110-120, and 110-21, respectively. In each example, variations are shown in the size and shape of the valleys between the two body portions, the connecting portions, the seal parts S, the seals created thereby, wall thickness, and the like. The disclosed insert devices may undergo many modifications and variations within the spirit and scope of the disclosure. The size, shape, thickness, and the like of the structures of the connecting portion can vary in the axial direction, the radial direction, and the circumferential direction. Thus, the holes or gaps provided in or among the connecting portion, if any, may also vary in size in the same directions. The holes and the connecting portion structures can be radially deeper or shallower, if desired. The axial length and radial depth of the spline groove and/or spline groove sections can also vary. The spline groove or spline groove sections can include rounded corners at their depth, and the radius of those corners can vary, or the corners can be sharper, less rounded. The seal part S and the inner and/or outer seals can also be positioned at different locations on the annular body B of the insert device relative to the spline groove portion. The size and shape of the seal part S and the inner and/or outer seals can also vary considerably, as illustrated herein. In further alternate examples, an insert device can combine one or more features, aspects, or characteristics of any one or more of the disclosed insert devices as well.

In yet another example, not shown, an insert device can have an annular body B that has a separate, thin, planar connecting portion joining the spline groove and annular seal portions. The connecting portion may include holes or apertures spaced apart around the circumference of the annular body. Each of the annular seal and spline groove portions may also be a thin walled, three sided, somewhat rectangular shape defining a groove or channel therein and may be separated by a U-shaped valley. The annular seal portion may have a thicker radial outer wall than the spline portion, but each may have a generally rectangular shape. A seal in this example may be positioned in the seal groove and adhered or otherwise co-molded, insert molded, or overmolded within the seal groove. Further, the seal may only have a relatively flat exposed inner or ID seal surface, which can include circumferential spaced apart ribs, if desired. The spline groove may be for an extruded spline as described above. Surfaces of the annular body B may include rounded, smooth transitions, sharp corners, protrusions, or other characteristics desired for a given application. The thickness of portions of the annular body B may also be varied for the same reasons. These features may be designed to accommodate a belling process, the material of the belled end of a pipe, the desired insert device retention characteristics within the belled end, and the like. As the foregoing examples illustrate, the various details and features of the insert device can be varied according to the needs or design characteristics of a given application of the insert device.

Figure 35:
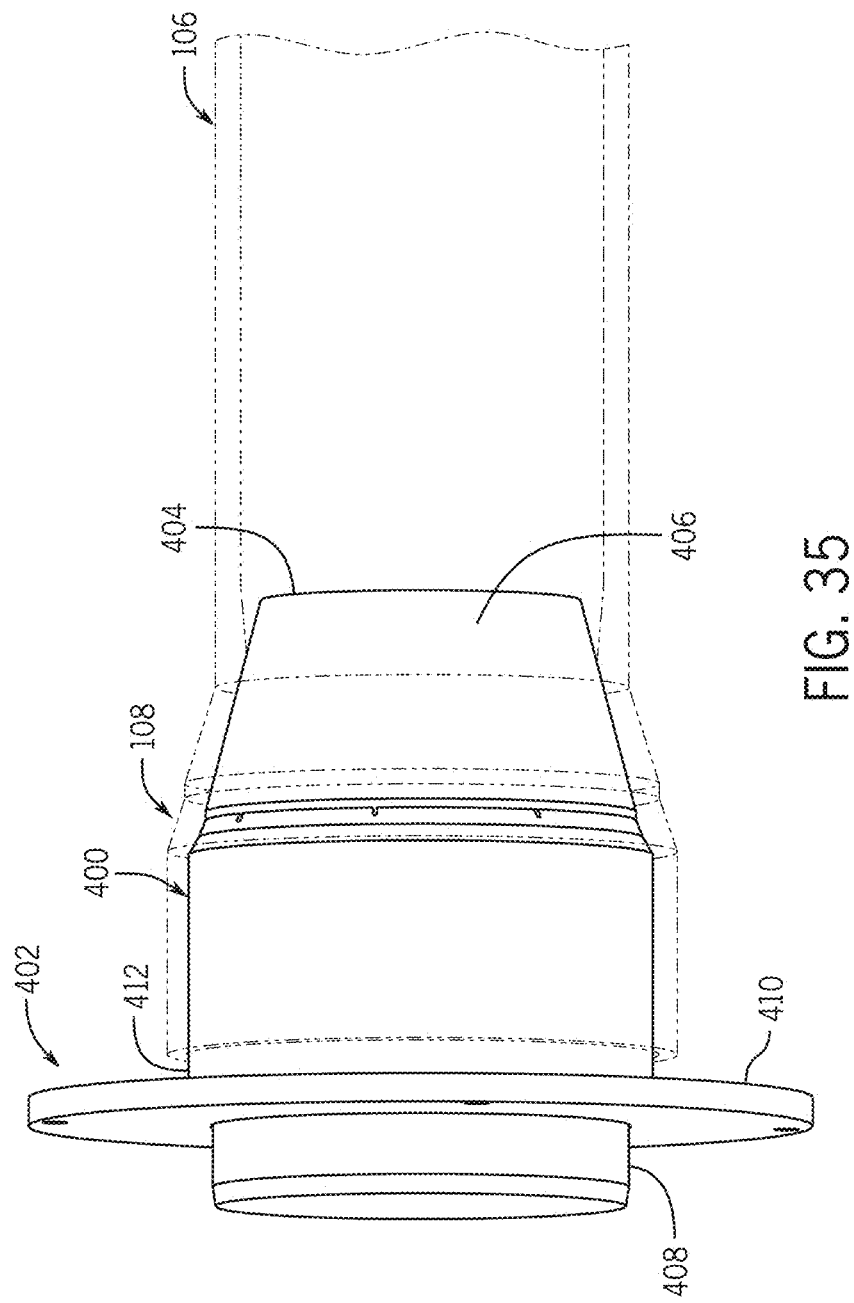
FIG. 35 shows a belling tool assembly and a portion of a pipe in accordance with the teachings of the present disclosure.

The methods used to form a belled end 108 on a second pipe 106, which includes a pre-disposed or pre-installed insert device as disclosed herein, can vary according to the teachings of the present disclosure. Referring to FIGS. 35, one example of a method utilizes a bell-shaped mandrel 400 and a stripper plate 402. In general, the mandrel 400 is forced into the distal end 162 of a hot or heated second pipe 106. The mandrel 400 is somewhat bullet shaped and may have a smaller diameter nose 404, a tapered, gradually increasing diameter section 406, and a constant larger diameter section 408. The mandrel 400 is configured to gradually increase the ID of the distal end 162 opening and an end portion of the hot pipe material as the mandrel is forced further into the end of the second pipe 106. The end 108 of the pipe takes on the bell-like shape of the mandrel 400. This shaping process can be done while the pipe 106 is hot after being extruded.

Figure 36:
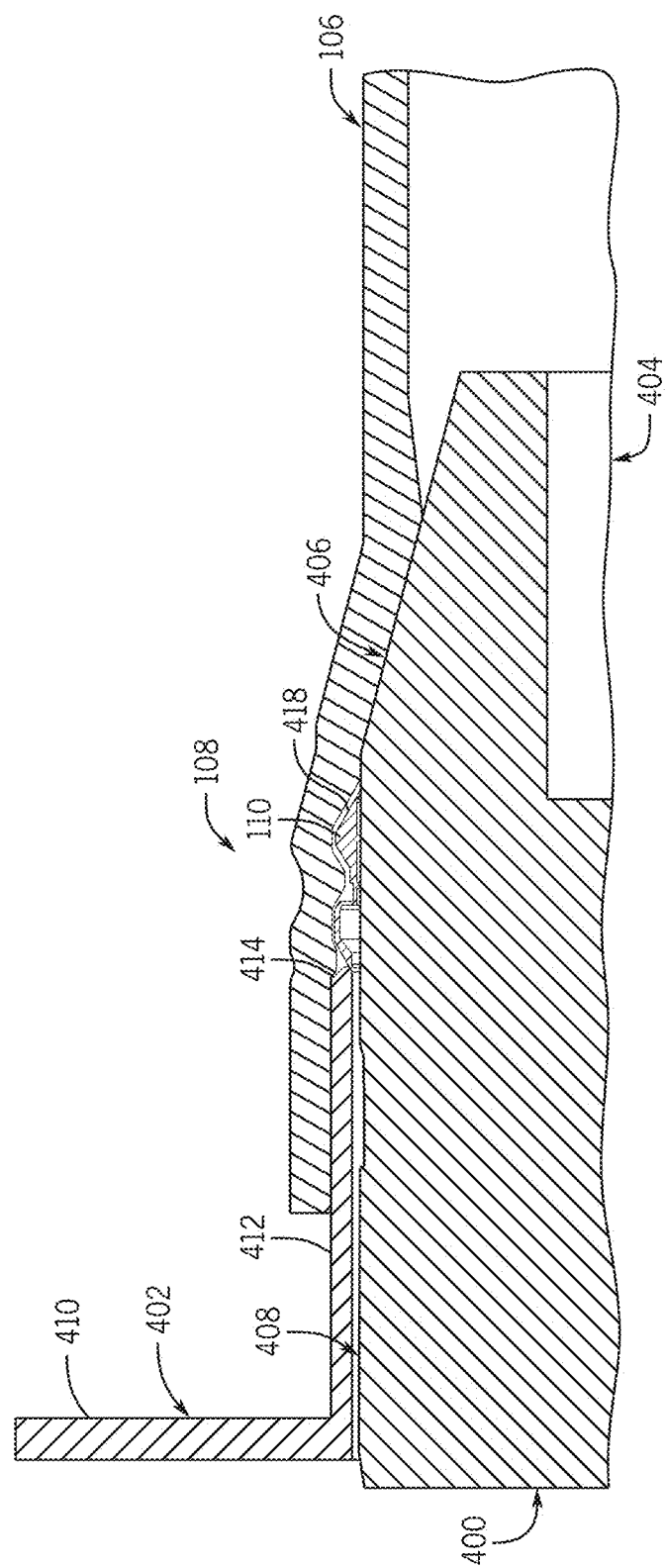
FIG. 36 shows a cross-section view of one example of a portion of a belling tool assembly and a portion of a belled pipe and an insert device constructed in accordance with the teachings of the present disclosure and at a stage during forming of the belled end of the pipe.

In this example, the stripper plate 402 is configured to interact with the mandrel 400 as shown in FIGS. 35 and 36. The stripper plate 400 may have a disc portion 410 oriented perpendicular to the axis of the pipe 106 and the mandrel 400. The stripper plate 402 also has a cylindrical section 412 that is sized to fit over the constant larger diameter section 408 of the mandrel 400. The cylindrical section 412 is also sized or shaped to forcibly fit within the distal end 162 portion of the pipe 106 as shown in FIG. 35, as the mandrel 400 is forced into the distal end 162 of the pipe 106, or vice versa. The free end of the cylinder section 412 has a shallow taper 414 to aid in the distal end 162 of the pipe 106 being forced over the tapered end and the cylindrical section of the stripper plate 402 and the mandrel 400.

As shown in FIGS. 35 and 36, an insert device, generically identified as insert device 110 for describing the process, may be mounted on the mandrel 400 at a desired position along the constant diameter portion 408 of the mandrel. The tapered or free end of the cylindrical section 412 of the stripper plate 402 abuts the tapered face, i.e., a leading edge or end 418 of the insert device 110 as shown in FIG. 36. The stripper plate 402 thus may hold the insert device 110 in the desired position on the mandrel 400 as the mandrel is forced into the end of the pipe 106 or the pipe is forced onto the mandrel. Instead of the distal end 162 of the pipe 106 pushing the insert device 110 along the outer surface 416 of the mandrel 400, the stripper plate 402 holds the insert device in place. The end of the pipe 106, while the material is hot, will thus pass over and onto the insert device 110 and the cylindrical section 412 of the stripper plate 402. The leading edge or end of the insert device 110 may also have a ramped or tapered end or face 418 that gradually expands the distal end 162 of the pipe 106 so that the pipe can pass over the insert device. FIG. 36 shows the pipe end 108 over the mandrel 400, the cylindrical section 412 of the stripper plate 402, and the insert device 110 after the mandrel is forced into the end of the pipe, or vice versa.

When the pipe 106 has taken the desired bell shape 108, the pipe is disposed axially at a specific desired position relative to the mandrel 400 and the insert device 110 is captured between the ID surface 114 of the pipe 106 and the outer surface 416 of the mandrel 400. A vacuum can be applied via the stripper plate 402 and/or through the mandrel 400, and through the various vacuum openings or holes in the annular body B of the insert device 110. The vacuum can aid in pulling or drawing the plastic material of the hot pipe 106 radially inward onto the mandrel 400 and thus the annular body B of the insert device 110. This can help to form the shape of the belled end 108 of the second pipe 106. Alternatively, the belled end 108 may be pressed onto the 400 mandrel as the pipe 106 cools. More specifically, the insert recesses or grooves 112 are formed as the insert device 110 is pressed into the warm pipe 106 material. The pipe 106 is pre-heated, after-hardened, and formed. Then the bell end 108 is heated and pressed onto the mandrel 400. The belled end 108 is then pulled or drawn via vacuum or pressed onto the mandrel and around the insert device 110.

The stripper plate 402 can be withdrawn from or along the mandrel 400 and thus the distal end 162 of the pipe 106. The belled end 108 of the heated pipe is then cooled. The vacuum may be applied or continue to be applied after the stripper plate 402 is withdrawn. Cooling of the pipe material further shrinks the expanded pipe diameter, except that the insert device 110 prevents the pipe from shrinking thereat. The mandrel 400 may also be withdrawn relative to the pipe once the pipe material cools sufficiently. The insert device 110 is captured in insert recesses 112 or grooves that form around the ID surface 114 of the pipe 106 as it shrinks in diameter in order to accommodate the insert device. The insert device 110 is thus pre-disposed, pre-installed, or self-installed within the belled end 108 of the pipe 106. The insert recess 112 formed in the belled end 108 takes the shape of the outer or OD surface of the insert device 110 and retains the position of the insert device within the pipe joint assembly. The bell shape in the second pipe 106 may be formed so that the first pipe 102 is inserted to a precise, predetermined depth in the pipe joint assembly, as described above. The gradual increase in pipe diameter can thus create a stop for the first pipe 102 when inserted in the belled end 108 of the second pipe 106. This depth should insure that the spline grooves of the two pipes axially align with one another and so that the seal within the second pipe is positioned against a flat portion of the OD of the first pipe to create an adequate seal, as described above.

Figure 37:
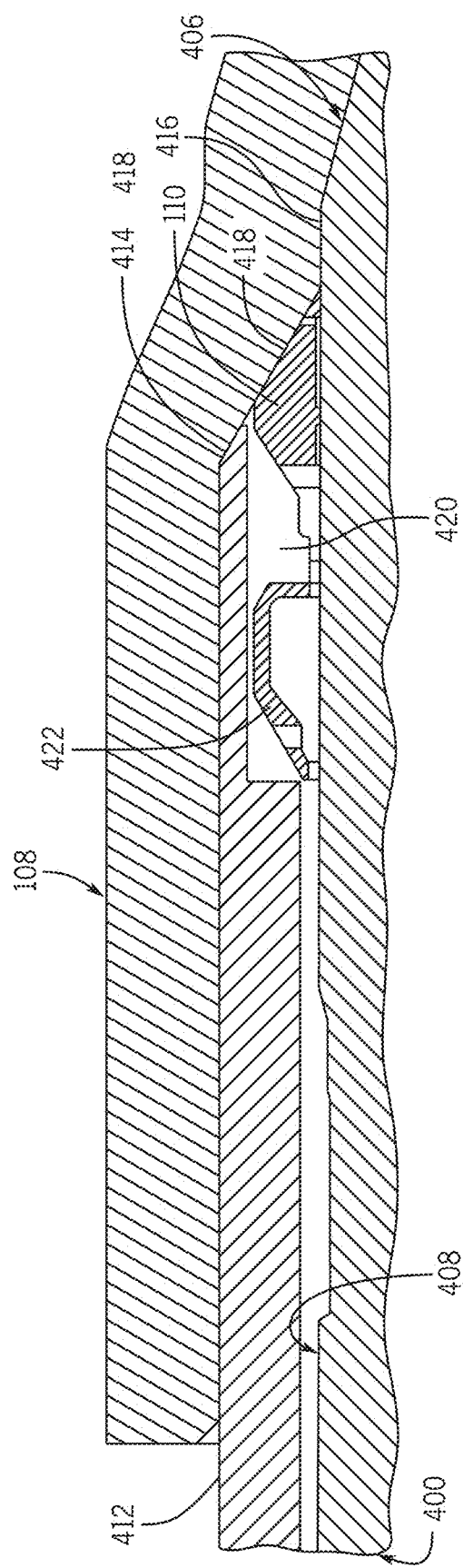
FIG. 37 shows a cross-section view of another example of a portion of a belling tool assembly and a portion of a belled pipe and an insert device constructed in accordance with the teachings of the present disclosure and at a stage during forming of the belled end of the pipe.
Figure 38:
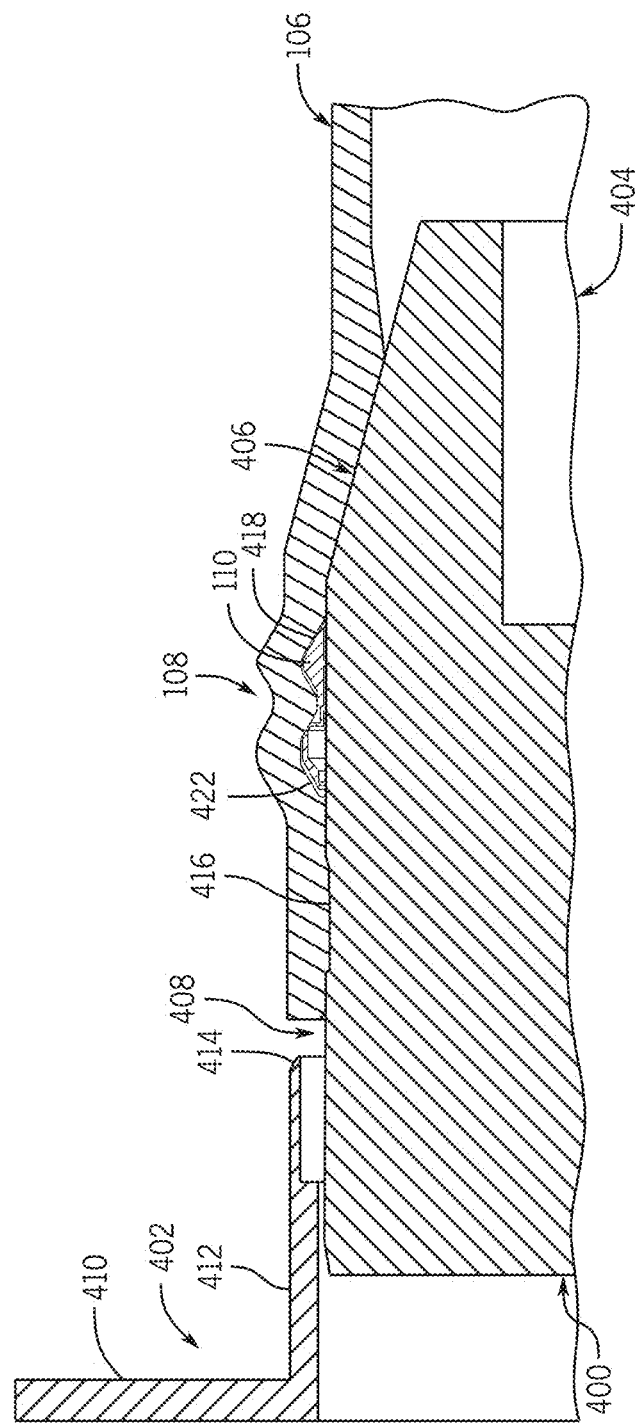
FIG. 38 shows the belling tool assembly at a different stage during forming of the belled of the pipe of FIG. 37.
Figure 39:
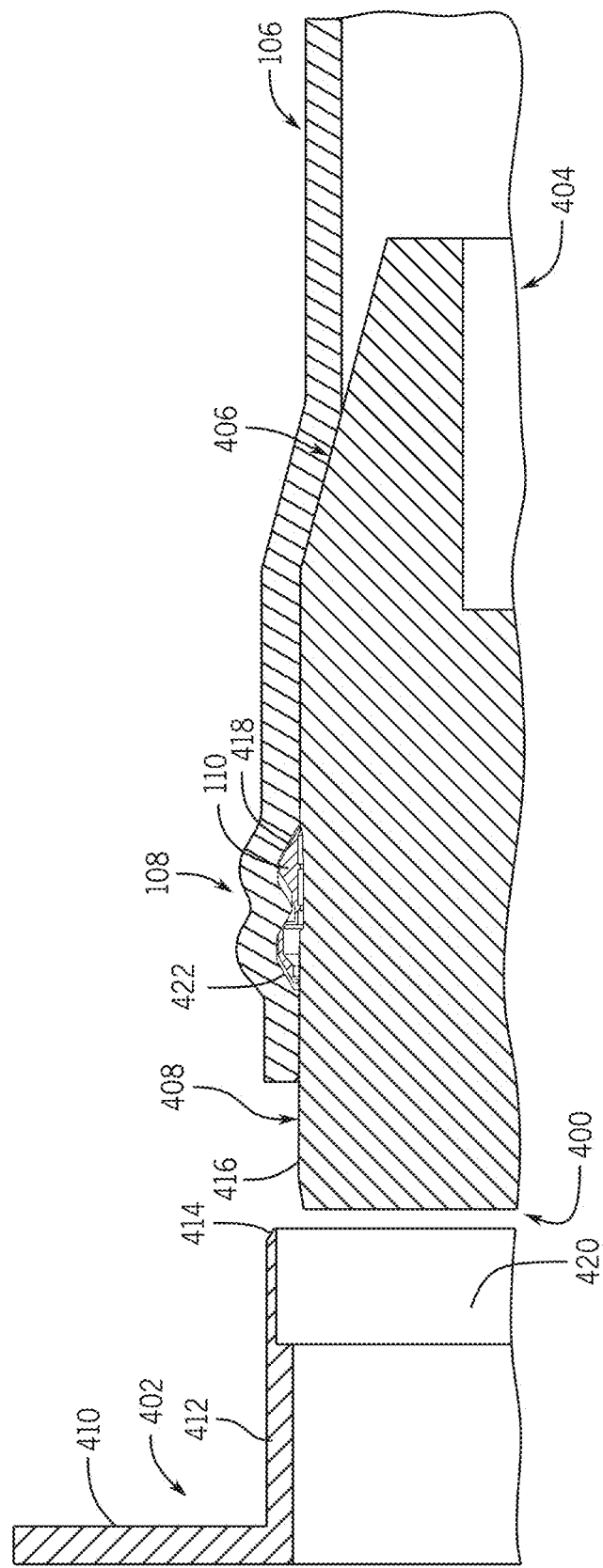
FIG. 39 shows a cross-section view of another example of a portion of a belling tool assembly and a portion of a belled pipe and an insert device constructed in accordance with the teachings of the present disclosure and at the same stage during forming of the belled end of the pipe as shown in FIG. 38.

Various aspects of the method, belling tool assembly, and the pipe joint assembly formed thereby can vary within the scope of the present disclosure. FIGS. 37-39 show examples of only several of the many aspects that may be varied. As shown in FIG. 37, the cylindrical section 412 of the stripper plate 400 may be provided with a pocket 420 that is formed in the ID surface at the free end. The pocket 420 can be sized and configured to extend over and cover the insert device 110 when the stripper plate 402 is in position to receive the distal end 162 of a pipe 106 for belling. The end of the pocket 420 can be positioned to abut the leading edge 418 of the insert device 110 to position and hold it along the mandrel 400 where desired. The pocket 420 may be provided to aid in preventing the insert device 110 from rolling, buckling, or otherwise deforming as the end of the pipe 106 is forced axially along the mandrel 400. The leading edge 418 of the insert device 110 may be exposed, as shown, and may have the ramped or tapered surface to help the end of the pipe 106 to pass over the insert device and the stripper plate 402.

FIG. 37 shows a stage of the forming process of the belled end 108 of a pipe 106 where the pipe is forced over the 400 mandrel, or vice versa, to the desired position to properly place the insert device 110 within the belled end. FIG. 38 shows the bell tooling assembly at a stage where the stripper plate 402 has been withdrawn from the end of the pipe 106 and the pipe is cooling or has cooled. The free end of the pipe 106 shrinks to a size defined by the diameter of the constant larger diameter portion 408 of the mandrel 400. The insert recesses 112 are formed in the ID surface 114 of the belled end 108 and the insert device 110 is captured in the insert recess or recesses 112. The mandrel 400 may then be withdrawn, leaving the insert device 110 in place within the belled end 108 of the pipe 106. The pipe and seal characteristics in FIGS. 37 and 38 are otherwise similar to those of FIGS. 35 and 36. FIG. 39 shows a bell tooling assembly similar to that of FIG. 38, but with the insert device 110 positioned at a different location along the mandrel 400 and thus the end of the pipe 106.

Figure 42:
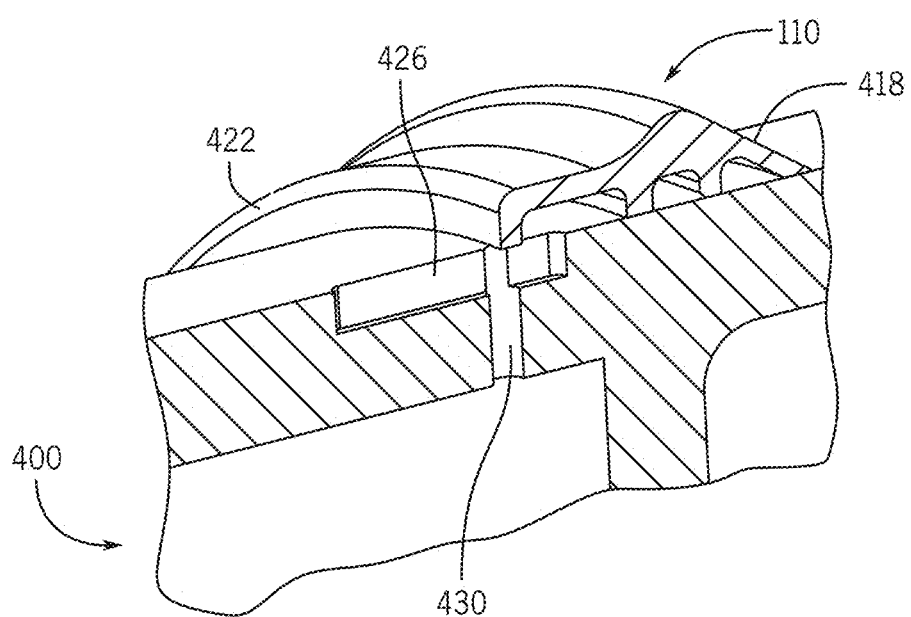

As noted above, aspects of the method, belling tool assembly, and the pipe joint assembly formed thereby can vary within the scope of the present disclosure. FIGS. 40-42 show further examples of aspects that may be varied. As shown in FIGS. 40-42, the belling tool assembly can include a mandrel 400 with vacuum ports or slots 426 around the outer surface 416. The slots 426 are in fluid communication with corresponding air flow passages 430, which are in fluid communication with an air flow chamber or chambers 432. A negative pressure is applied to the chamber or chambers 432, which applies a vacuum to the passages 430 and slots or ports 426 at the outer surface 416 of the mandrel 400.

The vacuum ports or slots 426 in this example have an axial length sufficient to perform a dual purpose. As shown in FIGS. 41 and 42, a portion of each slot 426 aligns with and underlies part of the installed insert device 110, which extends around the mandrel 400. A portion of each slot 426 is exposed to the outer surface of the mandrel. A negative pressure or vacuum is applied to the slots 426 when a heated end of a pipe 106 is forced onto the mandrel 400. The vacuum may aid in holding the insert device 110 in place on the mandrel, as shown in FIGS. 41 and 42. The vacuum will also aid in drawing the material of the end of the pipe that overlies the exposed portions of the slots toward the mandrel. This aids in forming the recesses in the ID surface of the belled end of the pipe around the insert device.

In this example, as shown in FIG. 41, the mandrel 400 can be fitted onto and secured on a cylinder or shaft 434 to fix the mandrel for use. The mandrel 400 can be secured using a nut 436 over a threaded end of the shaft 434. O-rings or seals can be used within the interior of the mandrel 400 to form a seal between the shaft 434 and mandrel body and to create the air chamber 432 in the mandrel 400. A shaft air passage 438 can extend along the cylinder or shaft 434 and one end can be connected to a vacuum source (not shown). The other end or other portions of the shaft passage 438 can be in fluid communication with the air chamber or chambers 432 within the mandrel 400 through one or more bores or holes 440 between the shaft air passage and the air chamber or chambers. The negative pressure can be applied to the mandrel 400 via the shaft air passage 438.

The belling tool assembly can be configured and modified to accommodate belling a pipe end while also installing insert devices of different constructions. The insert devices disclosed herein can be formed using any suitable process or processes. The annular body of the insert device may be machined, cut, molded, or the like and can be made from any suitable material, such as PVC, Nylon, Urethane, or the like. The bell tooling assembly and process can be configured to accommodate such insert devices as disclosed and described herein.

Though not shown herein, the outer circumference of the mandrel may include an annular shallow recess to receive the insert device thereon when installed. The recess may provide accurate axial positioning of the insert device and may also provide some resistance to axial movement of the insert device when the pipe end is forced over the mandrel during formation of the belled end of the pipe. Otherwise, as depicted in FIG. 42, a portion of the annular body, such as the above-described contact surfaces 326 of an insert device 110 can be radially undersized to create an interference (see interference A) between the mandrel 400 outer surface 416 and the insert device to aid in holding its position during formation of the belled end 108 of the pipe 106. Further, the passages and slots or holes can be machined or otherwise formed in the mandrel body.

As illustrated according to the embodiments and examples described above, various aspects of the insert devices can also vary within the scope of the present disclosure. Many examples are described herein. In some examples, the annular body of the insert device may include a substantially consistent wall thickness, in a radial direction, from axial leading edge to axial trailing edge on the body B. In other examples, the wall thickness may vary, in a radial direction, from leading edge to trailing edge on the body B. In some examples, a wall thickness of the belled end 108 of the pipe 106 may be approximately equal to a wall thickness of the non-belled remaining length of the pipe. In other examples, the belled female end 108 of the pipe 106 may have a wall thickness that is greater than or less than a wall thickness of the non-belled remaining length of the pipe. For example, the wall thickness of the female belled end of the pipe may be about 5% to about 20% thicker than the wall thickness of the non-belled remaining length of the pipe.

Examples of the insert device may include a compression ratio of about 10% to about 35%, over a range of pipe-to-pipe angular deflection of about 0 degrees to about 6 degrees. For example, about 0 degrees to about 6 degrees of pipe-to-pipe deflection (i.e., an angle formed between a central axis of a first pipe and a central axis of a second pipe at a pipe joint assembly as measured at opposite pipe ends) may be the defined deflection or pipe flex.

In one example of the method, no cutting or machining of the female belled end is required to form the final pipe joint assembly. In one example, neither the spline groove nor the annular seal groove requires machining operations in the belled end of the pipe before or after belling. In another example, the insert device is automatically placed and installed in the belled end during belling of the pipe. In another example, the method may further include coupling the first pipe and the insert device to a second pipe to form a pipe joint assembly by using a mechanical restraint (i.e., a spline, as shown herein) within spline grooves in the second pipe and in the insert device of the first pipe. The pipe joint assembly can thus be a restrained joint type of pipe coupling. In some examples, the final pipe joint assembly may have a tensile strength in a range of about 5,000 lbs. to about 250,000 lbs.

Examples of the insert device may have an aspect ratio (AR) of axial length (AL) to radial height (RH) that can vary. For example, the AR of an insert device can be in a range of about 3.0 to about 5.0, without the spline groove portion or the seal portion. In another example, the AR of an insert device may be in a range of about 6.0 to about 9.0, with both the spline groove portion and the seal portion. Examples of the annular body may have an AR, without the spline groove portion or the seal portion, in a range of about 5.0 to about 7.0. With both the spline groove portion and seal portion, the annular body AR can be in a range of about 10.0 to about 15.0. Examples of an insert device with the seal portion, but without the spline groove portion, may have an AR in a range of about 2.0 to about 3.0. Other examples are certainly possible within the scope of the disclosure.

Examples of the seal may include a plurality of annular ridges or ribs on the ID surface, as noted above. In some examples, the ridges may be symmetrically spaced apart from one another and from axial ends of the seal. Examples of the ribs or ridges may be configured to have a compression ratio of about 10% to about 35% against a mating pipe. Examples of the ribs or ridges may protrude radially inward from a main body of the seal in a range of about 0.1 inches to about 1 inch, depending on the size of the pipes being joined. In other examples, the ribs or ridges on the seal may have one or more specific shapes, such as triangular prisms, half ellipses, half spheres, non-symmetric prisms, angled elements, kidney-shaped elements, and the like. Also as noted above, the seal material may have one or more annular ribs on the OD surface to mate with and seal against an ID surface of a joined pipe.

The shape and configuration of the spline groove in the insert device can also vary depending on the type of spline and joint to be used between two pipes. Many of the above described drawings show a two-depth radius spline groove to be used with the Certa-Lok® CLIC pipe joint configuration of the assignee, which are described in the below-noted pending applications. Other examples an insert device include a different, earlier, standard spline groove shape having a single radius depth for use with an extruded spline as described in more detail below. Some of the insert device examples are also of the single hump configuration, though each includes both a seal portion and a spline portion, and some are of the two hump configuration.

As shown in a number of the foregoing examples, the edges of the annular body of the insert device may include spaced apart notches around the circumference of the device. The notches, i.e., relief notches, can aid in the insert device material spreading out during install on a mandrel without breaking.

Co-pending U.S. application Ser. Nos. 15/882,696 and 15/882,726, both filed on Jan. 29, 2018, and Ser. No. 16/134,561, filed on Sep. 18, 2018, are each incorporated in their entirety herein. Each discloses details and aspects of examples of the spline and the splined pipe joint noted above. In those applications, the spline grooves on the ID of the belled pipe are formed in the pipe material directly. In the examples disclosed herein, the spline grooves in the belled end of the pipe are formed in the insert device. The splines and groove shapes may vary, and particularly, may vary to at least include the examples in these co-pending applications. As noted above, an expandable spline, snap ring, retainer ring, or the like is received in the mating spline grooves of the belled polymer pipe and the joined second pipe, also a polymer pipe. The spline seats in both grooves preventing the two pipes from being separated in an axial direction, as described and shown in these co-pending applications. The spline can be expanded, while still residing in the spline groove of the belled pipe to allow separation of the two pipes. Some of the examples include a conventional rectangular spline groove, i.e., an extruded spline, that allows a spline to be inserted via a hole through the belled end of a pipe. The spline resides in the two grooves to prevent axial separation of the pipe joint. The spline can be withdrawn from the grooves through the hole to allow disassembly of the pipe joint.

Depending on the style of pipe joint and the type of groove, the splines used in the disclosed examples may include an extruded spline with a generally square or rectangular cross-section. Such a spline will prevent disassembly of a pipe joint, unless the spline is removed by pulling it from the spline grooves, such as with a tool as is known in the art. Instead, the splines may include a portion that is angled, tapered, chamfered, or ramped in order to permit spigot insertion with the spline already in place. The disclosed insert devices may be utilized and designed accordingly to accommodate the desired type of spline and joint.

Although certain insert devices, pipe belled ends, pipe joint assemblies, and forming methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A polymer pipe comprising:
    a length between a first end and a second end, the length and the first end having a first diameter, and the second end being a belled end having a second diameter larger than the first diameter; and
    an insert device received within the second end, the insert device having an annular body with a seal part coupled to the annular body and a spline groove formed in the annular body and facing radially inward,
    wherein the annular body is a molded element and the seal part is contiguous with the annular body whereby the insert device is an integral monolithic structure,
    wherein a material of the annular body is substantially rigid and a material of the seal part is softer or less rigid than the material of the annular body,
    wherein the seal part includes an inner seal facing radially inward and exposed to an inside diameter (ID) of the annular body,
    wherein the seal part has an outer seal exposed to an outside diameter (OD) of the annular body, and
    wherein the inner seal and the outer seal are joined to one another through the annular body via openings passing between the ID and the OD through the annular body.

2. The polymer pipe of claim 1, further comprising one or more insert recesses formed in an ID surface of the second end, the annular body seated in the one or more insert recesses.

3. The polymer pipe of claim 2, wherein the one or more insert recesses, formed during a belling process at the second end of the pipe, conform to a contour of a radially outer surface of the annular body.

4. The polymer pipe of claim 1, wherein the seal part is a co-molded, insert molded, or over-molded element contiguous with the annular body as a part of the insert device.

5. The polymer pipe of claim 1, further comprising a second pipe joined to the polymer pipe to form a pipe joint assembly, wherein the second pipe has one end installed in the second end of the polymer pipe whereby the inner seal of the seal part contacts an OD surface of the second pipe.

6. The polymer pipe of claim 5, wherein the second pipe of the pipe joint assembly has a mating spline groove on the OD surface that is axially aligned with the spline groove in the annular body of the insert device.

7. The polymer pipe of claim 1, wherein the annular body of the insert device is formed of a polymer material, and wherein the seal part of the insert device is formed of an elastomer material that is softer or less rigid than the polymer material.

8. The polymer pipe of claim 1, wherein the inner seal and the outer seal are joined to one another through a seal portion of the annular body.

9. The polymer pipe of claim 7, wherein the elastomer material comprises at least one of isoprene rubber (IR), styrene butadiene rubber (SBR), IR/SBR blend, nitrile, ethylene propylene diene monomer (EPDM) rubber, a synthetic rubber, and fluoropolymer elastomer.

10. The polymer pipe of claim 1, wherein the insert device has an ID in a range of about 3 inches to about 48 inches and an axial length of about 0.125 inches to about 3 inches.

11. The polymer pipe of claim 1, wherein the annular body includes a spline portion having the spline groove, a seal portion having the seal part and axially spaced from the spline portion, and a connecting portion disposed axially between and connecting the spline portion and the seal portion.

12. The polymer pipe of claim 11, wherein the connecting portion includes a plurality of circumferentially spaced apart bridges or ribs and includes holes, voids, or spaces circumferentially therebetween.

13. The polymer pipe of claim 1, wherein a void is provided in the annular body facing radially inward in the same direction as the spline groove, the void extending circumferentially around the insert device and disposed axially between a tapered face of the annular body and the spline groove.

14. A pipe joint assembly comprising:
a polymer first pipe having a length between first and second ends, the second end being a spigot end, the length, the first end, and the spigot end having a first diameter;
a polymer second pipe having a length between a first end and a second end, the length and the first end having the first diameter, and the second end being a belled end having a second diameter larger than the first diameter;
an insert device received within the second end, the insert device having an annular body, a seal part carried by the annular body, and a spline groove formed in the annular body and facing radially inward;
the spigot end of the first pipe installed in the belled end of the second pipe, the first pipe having a mating spline groove on an outside diameter (OD) surface that is axially aligned with the spline groove in the annular body of the insert device; and
a spline received in the spline groove and the mating spline groove axially joining the first and second pipes,
wherein the annular body is a molded element and the seal part is contiguous with the annular body whereby the insert device is an integral monolithic structure,
wherein a material of the annular body is substantially rigid and a material of the seal part is softer or less rigid than the material of the annular body,
wherein the seal part includes an inner seal in contact with the OD surface of the first pipe,
wherein the seal part has an outer seal in contact with an inside diameter (ID) surface of the second pipe, and
wherein the inner seal and the outer seal are joined to one another through the annular body via openings passing between the ID and the OD through the annular body.

15. The pipe joint assembly of claim 14, wherein a void is provided in the annular body facing radially inward in the same direction as the spline groove, the void extending circumferentially around the insert device and disposed axially between a tapered face of the annular body and the spline groove.

16. The pipe joint assembly of claim 14, wherein the first pipe, the second pipe, the spline, and the insert device are each entirely non-metallic.

17. A method of sealing a pipe joint, the method comprising:
providing a first pipe having a spigot end;
providing a second pipe having a belled end, the belled end of the second pipe sized to receive therein the spigot end of the first pipe, wherein a mating spline groove is provided on an outside diameter (OD) surface of the first pipe;
installing an insert device seated in and retained within the belled end, the insert device including an annular body defining a spline groove facing radially inward and carrying a seal part, wherein the annular body is a molded element and the seal part is contiguous with the annular body whereby the insert device is an integral monolithic structure, and wherein a material of the annular body is substantially rigid and a material of the seal part is softer or less rigid than the material of the annular body; and
inserting the spigot end of the first pipe into the belled end of the second pipe such that the mating spline groove is axially aligned with the spline groove in the annular body,
whereby the seal part has an inner seal in contact with the OD of the first pipe at a position axially spaced from the spline groove and the mating spline groove, and
wherein the seal part has an outer seal in contact with an inside diameter (ID) of the second pipe, and
wherein the inner seal and the outer seal are joined to one another through the annular body via openings passing between the ID and the OD through the annular body.

18. The method of claim 17, further comprising:
inserting a spline into the spline groove and the mating spline groove to axially retain the first and second pipes joined to one another.

19. A pipe system comprising:
a polymer pipe having a length between a first end and a second end, the length and the first end having a first diameter, and the second end being a belled end having a second diameter larger than the first diameter;
one or more insert recesses formed in an inside diameter (ID) surface of the belled end of the polymer pipe; and
an insert device received within the belled end, the insert device having an annular body with an outside diameter (OD) surface seated in the one or more insert recesses and having a seal part coupled to the annular body and a spline groove formed in the annular body and facing radially inward,
wherein the annular body is a molded element and the seal part is contiguous with the annular body whereby the insert device is an integral monolithic structure, and
wherein a material of the annular body is substantially rigid and a material of the seal part is softer or less rigid than the material of the annular body,
wherein the seal part includes an inner seal facing radially inward and exposed to an ID of the annular body,
wherein the seal part has an outer seal in contact with the ID surface of the belled end of the polymer pipe, and wherein the inner seal and the outer seal are joined to one another through the annular body via openings passing between the ID and the OD through the annular body.

20. The pipe system of claim 19, further comprising:

a second polymer pipe having a spigot end installed in the belled end of the polymer pipe, the second polymer pipe having a mating spline groove on an outside diameter (OD) surface that is axially aligned with the spline groove in the annular body of the insert device; and a spline received in the spline groove and the mating spline groove, the spline axially joining the polymer pipe and the second pipe.

21. The pipe system of claim 20, wherein the inner seal sealingly engages the OD surface of the second polymer pipe.

* * * * *